US007734616B2

(12) United States Patent
Mogi et al.

(10) Patent No.: US 7,734,616 B2
(45) Date of Patent: *Jun. 8, 2010

(54) STORAGE SYSTEM HAVING MEANS FOR ACQUIRING EXECUTION INFORMATION OF DATABASE MANAGEMENT SYSTEM

(75) Inventors: Kazuhiko Mogi, Yokohama (JP);
Takashi Oeda, Sagamihara (JP);
Masaru Kitsuregawa, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 11/182,281

(22) Filed: Jul. 14, 2005

(65) Prior Publication Data

US 2005/0267878 A1 Dec. 1, 2005

Related U.S. Application Data

(63) Continuation of application No. 10/093,682, filed on Mar. 7, 2002, now Pat. No. 6,928,451.

(30) Foreign Application Priority Data

Nov. 14, 2001 (JP) ............................. 2001-348168

(51) Int. Cl.
*G06F 7/00* (2006.01)
*G06F 17/30* (2006.01)
(52) U.S. Cl. ............................. 707/713; 707/999.003
(58) Field of Classification Search ................ 707/3
See application file for complete search history.

(56) References Cited

U.S. PATENT DOCUMENTS 4,533,995 A * 8/1985 Christian et al. ............ 711/122
4,627,019 A * 12/1986 Ng ................................ 707/8
4,642,756 A * 2/1987 Sherrod ....................... 718/103

5,317,727 A * 5/1994 Tsuchida et al. ............. 707/2

(Continued)

FOREIGN PATENT DOCUMENTS

JP 11-095934 A 4/1999

OTHER PUBLICATIONS

Bouganim et al., "Dynamic Query Scheduling in Data Integration Systems," 2000, IEEE, Data Engineering 2000. Proceedings. 16th International Conference.*

(Continued)

*Primary Examiner*—Pierre M Vital
*Assistant Examiner*—Rachel J Lee
(74) *Attorney, Agent, or Firm*—Townsend and Townsend and Crew LLP

(57) ABSTRACT

A storage system for providing a preferable data access performance by performing controls considering database management system (DBMS) execution information or database process priorities, by acquiring static configurational information of a DBMS by means of a DBMS information acquisition and communication program, a DBMS information communication section, and a host information setting program; acquiring DBMS execution information by means of a query plan acquisition program, the DBMS information communication section, and a process performance management program; acquiring information on priorities of database processes given by the process performance management program; and storing them in disk I/O management information with process priorities, DBMS execution information, and DBMS data information, in which cache control section in a storage system control program controls a data cache by referring to the above information.

18 Claims, 25 Drawing Sheets

U.S. PATENT DOCUMENTS

| | | | |
|---|---|---|---|
| 5,495,605 | A | 2/1996 | Cadot |
| 5,551,027 | A * | 8/1996 | Choy et al. ............... 707/201 |
| 5,625,815 | A | 4/1997 | Maier et al. |
| 5,794,228 | A | 8/1998 | French et al. |
| 5,809,495 | A * | 9/1998 | Loaiza ........................ 707/2 |
| 5,875,464 | A * | 2/1999 | Kirk .......................... 711/129 |
| 5,887,151 | A | 3/1999 | Raz et al. |
| 5,918,225 | A | 6/1999 | White et al. |
| 5,956,750 | A | 9/1999 | Yamamoto et al. |
| 6,341,288 | B1 | 1/2002 | Yach et al. |
| 6,477,525 | B1 | 11/2002 | Bello et al. |
| 6,697,818 | B2 | 2/2004 | Li et al. |
| 6,711,649 | B1 | 3/2004 | Bachmat et al. |
| 6,928,451 | B2 * | 8/2005 | Mogi et al. ............... 707/102 |
| 2001/0010053 | A1 * | 7/2001 | Ben-Shachar et al. ....... 709/105 |
| 2001/0029502 | A1 | 10/2001 | Ceda |
| 2001/0047273 | A1 * | 11/2001 | Greer et al. ................. 705/1 |
| 2002/0103793 | A1 | 8/2002 | Koller et al. |
| 2003/0115212 | A1 * | 6/2003 | Hornibrook et al. ..... 707/103 R |

OTHER PUBLICATIONS

Wang, Wenguang, "Storage Management in RDBMS," Department of Computer Science, University of Saskatchewan, 2001.*

Sheth et al.: "The Architecture of Braid: A System for Bridging Ai/Db Systems," IEEE Proceedings of the International Conference on Data Engineering Kobe, Japan, pp. 570-581 (Apr. 1991).

Mukai et al. "Evaluation of Prefetching Mechanism Using Access Plan on Intelligent Disk," Institute of Industrial Science, The University of Tokyo (Jul. 2000). yes.

Patterson et al. "Informed Prefetching and Caching," Proc. of the 15th ACM Symp. on Operating System Principles pp. 79-95 (Dec. 1999).

Japan Patent Office (JPO) office action dated Aug. 17, 2007 for JPO patent application JP2001-348168.

Hara et al. "Proposal of Data Reallocation Method for Parallel DB Server System," The 48th Information Processing Sociey of Japan pp. 207-208 (1994).

* cited by examiner

FIG. 4

Volume Physical Storage Location Management Information (42)

| VOLUME NAME (501) | VOLUME LOGICAL BLOCK NUMBER (512) | PHYSICAL STORAGE DEVICE NAME (502) | PHYSICAL BLOCK NUMBER (514) |
|---|---|---|---|
| Vol0 | 0 - 10239 | Pdisk 0 | 0 - 10239 |
| Vol0 | 10240 - 20479 | Pdisk 1 | 0 - 10239 |
| Vol1 | 0 - 10239 | Pdisk 0 | 10240 - 20479 |
| Vol1 | 10240 - 20479 | Pdisk 1 | 10240 - 20479 |
| ⋮ | ⋮ | ⋮ | ⋮ |

FIG. 5

Physical Storage Device Operating Information (32)

| | | | | | |
|---|---|---|---|---|---|
| VOLUME NAME | Vol0 | Vol0 | Vol1 | | 501 |
| PHYSICAL STORAGE DEVICE NAME | Pdisk 0 | Pdisk 1 | Pdisk 0 | | 502 |
| CUMULATIVE OPERATING TIME | 23917390 | 38902849 | 8012891 | | 503 |
| OLD CUMULATIVE OPERATING TIME | 22787638 | 38783484 | 7592039 | | 593 |
| OPERATING RATIO 2000/4/1 12:00~ 2000/4/1 12:15 | 20% | 12% | 4% | | 594 |
| OPERATING RATIO 2000/4/1 12:15~ 2000/4/1 12:30 | 15% | 10% | 7% | | |
| OPERATING RATIO 2000/4/1 12:30~ 2000/4/1 12:45 | 16% | 9% | 5% | | |
| ⋮ | ⋮ | ⋮ | ⋮ | ⋮ | |

595 — PREVIOUS CUMULATIVE OPERATING TIME ACQUISITION TIME: 2000/4/12 18:15

FIG. 8

| DBMS NAME | DBM S1 | DBM S1 | DBM S1 | | DBM S2 | | ~631 |
|---|---|---|---|---|---|---|---|
| DATA STRUCTURE NAME | T1 | T1 | T2 | | Ti | | ~561 |
| DATA STRUCTURE BLOCK ID NUMBER | 0 - 4999 | 5000 - 9999 | 0 - 239 | | 0 - 9999 | | ~716 |
| VOLUME NAME | Vol0 | Vol1 | Vol0 | | Vol2 | | ~501 |
| VOLUME BLOCK NUMBER | 0 - 4999 | 5000 - 9999 | 10000 - 10239 | | 0 - 9999 | | ~512 |
| PHYSICAL STORAGE DEVICE NAME | Pdisk 0 | Pdisk 0 | Pdisk 0 | | Pdisk 1 | | ~502 |
| PHYSICAL BLOCK NUMBER | 0 - 4999 | 10240 - 15239 | 10000 - 10239 | | 20480 - 30479 | | ~514 |

DATA STRUCTURE PHYSICAL STORAGE LOCATION INFORMATION ~712

FIG. 9

EXECUTION INFORMATION ID MANAGEMENT INFORMATION (800)

| EXECUTION INFORMATION ID (801) | DBMS NAME (631) | QUERY PLAN ID (802) | QUERY PRIORITY (803) | DBMS CACHE MANAGEMENT ID (811) |
|---|---|---|---|---|
| 0 | DBM S1 | 1728910 | MIDDLE | 67 |
| 1 | — | — | — | — |
| ⋮ | ⋮ | ⋮ | ⋮ | ⋮ |

DBMS PROCESS PLAN INFORMATION (805)

| EXECUTION INFORMATION ID (801) | EXECUTION INFORMATION INTERNAL ID NUMBER (806) | DATA STRUCTURE NAME (561) | EXECUTION ORDER (807) | ACCESS TYPE (808) |
|---|---|---|---|---|
| 0 | 0 | T3 | 1 | Sequential |
| 0 | 1 | T4 | 2 | Sequential |
| 0 | 2 | Ind1-1 | 3 | Tree Index |
| 0 | 3 | T1 | 3 | By Index |
| 1 | 0 | Ind1-2 | 1 | Random |
| ⋮ | ⋮ | ⋮ | ⋮ | ⋮ |

SEQUENTIAL PREFETCH INFORMATION (810)

| EXECUTION INFORMATION ID (801) | EXECUTION INFORMATION INTERNAL ID NUMBER (806) | DBMS CACHE MANAGEMENT ID (811) | DATA AREA RANGE (812) | PREFETCH POINTER (813) | ACCESS CONDITION (814) |
|---|---|---|---|---|---|
| 0 | 0 | 104 | 0-3343 | 3344 | EXECUTED |
| 0 | 0 | 105 | 3344-6687 | 6687 | EXECUTED |
| 0 | 0 | 106 | 6688-9999 | 9984 | EXECUTED |
| 0 | 1 | 152 | 0-2047 | 32 | NOT EXECUTED |
| ⋮ | ⋮ | ⋮ | ⋮ | ⋮ | ⋮ |

B-TREE INDEX PREFETCH INFORMATION (820)

| EXECUTION INFORMATION ID (801) | EXECUTION INFORMATION INTERNAL ID NUMBER (806) | DBMS CACHE MANAGEMENT ID (811) | INDEX ACCESS CONDITION (821) |
|---|---|---|---|
| 1 | 0 | 17 | TiNamel=Swim |
| 3 | 2 | 125 | TiNamel=Bush |
| ⋮ | ⋮ | ⋮ | ⋮ |

DATA STRUCTURE ACCESS INFORMATION (825)

| DBMS NAME (631) | DATA STRUCTURE NAME (561) | DATA ACCESS INFORMATION (826) | | | |
|---|---|---|---|---|---|
| | | ACCESS DESTINATION | | ACCESS SIZE | |
| DBM S1 | T1 | 9824 | 3336 | 8 | 8 |
| | T2 | 381 | 676 | 1 | 1 |
| | ⋮ | ⋮ | ⋮ | ⋮ | ⋮ |

DBMS EXECUTION INFORMATION (38)

FIG. 13

| DBMS NAME: DBM S1 | QUERY PLAN ID: 1728910 | QUERY PRIORITY: MIDDLE |

| PLAN NODE NAME | PLAN PARENT NODE NAME | NODE PROCESS CONTENT | ACCESS DATA STRUCTURE | PROCESS ORDER | NODE PROCESS DETAILS |
|---|---|---|---|---|---|
| N-1-1 | root | Sum | — | 3 | Sum(T1.B) |
| N-2-1 | N-1-1 | Nested Loop Join | — | 3 | T1.Key 1 - T3.Key 1 |
| N-3-1 | N-2-1 | Hash Join | — | 3 | T3.Key 3 - T4.Key 4 |
| N-3-2 | N-2-1 | Table Access by Index | T1 | 3 | — |
| N-4-1 | N-3-1 | Table Access Full | T3 | 1 | PARALLEL ACCESS PARTITIONED BY BLOCK ID |
| N-4-2 | N-3-1 | Filter | — | 2 | T4.N < 1(X) |
| N-4-3 | N-3-2 | Index Access | Ind.1-1 | 3 | Key 1 - [RESULT OF N-3-1] |
| N-5-1 | N-4-2 | Table Access Full | T4 | 2 | PARALLEL ACCESS ON PARTITIONED TABLE |

QUERY EXECUTION PLAN INFORMATION

QUERY PLAN INFORMATION

| FILESYSTEM NAME | FS0 | FS0 | FS1 | | —1001 |
|---|---|---|---|---|---|
| PHYSICAL STORAGE DEVICE NAME | Pdisk 0 | Pdisk 1 | Pdisk 0 | | —502 |
| CUMULATIVE OPERATING TIME | 23917390 | 38902849 | 8012891 | | —503 |
| OLD CUMULATIVE OPERATING TIME | 22787638 | 38783484 | 7592039 | | —593 |
| OPERATING RATIO 2000/4/1 12:00~ 2000/4/1 12:15 | 20% | 12% | 4% | | —594 |
| 2000/4/1 12:15~ 2000/4/1 12:30 | 15% | 10% | 7% | | |
| 2000/4/1 12:30~ 2000/4/1 12:45 | 16% | 9% | 5% | | |
| ⋮ | ⋮ | ⋮ | ⋮ | ⋮ | |

595 — PREVIOUS CUMULATIVE OPERATING TIME ACQUISITION TIME: 2000/4/12 18:15

PHYSICAL STORAGE DEVICE OPERATING INFORMATION —32b

FIG. 27

| DBMS NAME | DBM S1 | DBM S1 | DBM S1 | | DBM S2 | | 631 |
|---|---|---|---|---|---|---|---|
| DATA STRUCTURE NAME | T1 | T1 | T2 | | Ti | | 561 |
| DATA STRUCTURE BLOCK ID NUMBER | 0 - 4999 | 5000 - 9999 | 0 - 4999 | | 0 - 9999 | | 716 |
| FILESYSTEM NAME | FS1 | FS1 | FS1 | | FS2 | | 1001 |
| FILE PATH NAME | /data1.dat | /data1.dat | /data2.dat | | /datai.dat | | 1002 |
| FILE BLOCK NUMBER | 0 - 4999 | 5000 - 9999 | 0 - 4999 | | 0 - 9999 | | 1003 |
| PHYSICAL STORAGE DEVICE NAME | Pdisk 1 | Pdisk 0 | Pdisk 1 | | Pdisk 2 | | 502 |
| PHYSICAL BLOCK NUMBER | 10240-15239 | 10240-15239 | 15240-20239 | | 20180-30179 | | 514 |

DATA STRUCTURE PHYSICAL STORAGE LOCATION INFORMATION — 712b

STORAGE SYSTEM HAVING MEANS FOR ACQUIRING EXECUTION INFORMATION OF DATABASE MANAGEMENT SYSTEM

CROSS-REFERENCE TO RELATED APPLICATION(S)

This is a continuation of U.S. application Ser. No. 10/093,682, filed Mar. 7, 2002, and entitled "Storage System Having Means for Acquiring Execution Information of Database Management System," which application claimed priority from Japan Patent Application No. 2001-348168, filed Nov. 14, 2001.

BACKGROUND OF THE INVENTION

1. Field of the Invention

The present invention relates to a database management system.

2. Description of the Related Art

Currently, there are a large number of applications which are constructed based on a database (DB), thereby causing a database management system (DBMS) which is software for performing a series of processes and management related to the DB to be very important. Particularly, a process performance of the DBMS decides a performance of an application using a DB and therefore an improvement of the DBMS process performance is very important.

One of characteristics about DB is to handle a large amount of data. Therefore, a mass storage device is connected to a computer in which the DBMS is executed to store DB data into the storage system in a number of execution environments of the DBMS. Accordingly, when a process related to the DB is performed, accesses occur to the storage system and a data access performance in the storage system remarkably influences the DBMS performance. Therefore, an access optimization in the storage system is very important in a system where the DBMS is operating. In U.S. Pat. No. 5,317,727 (literature 1), there is disclosed a technology of improving a DBMS performance by reducing redundant accesses or by data prefetching. For an improvement of the DBMS performance, an I/O access performance is improved by implementing a prefetch, determining its amount, and controlling a cache (buffer) taking into consideration an execution plan for a query, data access characteristics, a cache memory amount, I/O load and the like in a portion of executing a query from a user.

In U.S. Pat. No. 5,956,750 (literature 2), there is disclosed, in a storage system where a logical storage device for use in accessing with a computer is allocated in a physical storage device for actually storing data, a technology of improving an access performance of the storage system by dynamically changing an allocation of the logical storage device in the physical storage device. By moving a part of the data stored in the physical storage device having a high access frequency to another physical storage device by using the above dynamic relocation function, a specific physical storage device is prevented from having an increased access frequency, thereby improving a performance of the entire storage system. In addition, there is disclosed an automatic execution method of improving performance with the dynamic relocation function.

In a paper titled "Evaluation of Prefetching Mechanism Using Access Plan on Intelligent Disk" (by Mukai et al., the 11th Data Engineering Workshop (DEWS2000), Lecture No. 3B-3 of Proceedings, CD-ROM issued on July 2000; Sponsored by The Institute of Electronics, Information and Communication Engineers, Data Engineering Technical Group) (literature 3), there is discussed an improvement of a DBMS performance with sophisticating a storage system by giving an example of a DB managed by a relational database management system (RDBMS).

If a query execution plan in the RDBMS is given to a storage system as the application-level knowledge, the storage system, after having read an index for a table in the RDBMS, gets capable of determining which block having data of the table should be accessed. Therefore, total data access time can be reduced by accessing the index in a lump to grasp block groups having data of the table to be accessed by the index and effectively scheduling accesses to them.

In addition, this process is executed independently from a computer in which the DBMS is executed, by which there is no need for awaiting an instruction from the computer. Furthermore, if data is distributed and allocated to a plurality of physical storage devices, the physical storage devices can be accessed in parallel and therefore a further reduction is expected on the DBMS process execution time.

In the literature 3, the above effect is checked by a simulation. In the simulation, the above function is not actually installed in a storage system, but they issue an instruction of a prefetch from the host side. The storage used for the simulation has two SCSI ports and these two ports share data cache in the storage system. Therefore, a data prefetch is realized by accessing data to be actually processed by the DBMS at one port and reading a block to be prefetched at the other port. The block to be prefetched is determined based on access trace information.

In U.S. Pat. No. 5,887,151 (literature 4), there is disclosed a technology of a storage system capable of receiving a plurality of blocks to be prefetched as a list in a single prefetch command.

A paper titled "Informed Prefetching and Caching" (by R. H. Patterson et al., Proc. of the 15th ACM Symp. on Operating System Principles, pp. 79-95, December 1995) (literature 5) discusses a function of prefetching data into a file chache on a computer in an operating system thereof by using hints related to files to be accessed issued by an application and to an accessed area and its control scheme. Particularly, it also covers an evaluation with a program in which an existing RDBMS is modified and indicates an effectiveness of this technology to the RDBMS. In the conventional technologies, however, there are the following problems.

The technology discussed in the literature 1 is one for the DBMS and a storage system is accessed by using a relative block address in an embodiment in this literature. Among the current mass storage devices, there are some having a cache memory or a plurality of physical storage devices in a storage system and operating them as a single storage system by using a storage system controller for controlling them. While there is room for further making full use of a higher access performance by optimizing an internal control in this storage system, the technology in the literature I does not take into consideration this kind of optimization of the internal process of the storage system.

The technology discussed in the literature 2 does not take into consideration the operating characteristics of the DBMS. Therefore, there is a possibility of allocating data, which are accessed by the DBMS at a time, to the same physical storage device, which may cause a decrease of the access performance of the DBMS. Furthermore, the optimization of a cache control in the storage system such as a data prefetch is not considered at all.

As for the technology discussed in the literature 5, an application is needed to issue a hint and therefore a program modification is required when it is applied to an existing DBMS. In general, the DBMS should be very reliable. Taking into consideration that the DBMS is a complicated program and its modification is not easy and that a program modification is a cause of decreasing reliability, this technology is not always applicable to an existing DBMS that has no such function.

BRIEF SUMMARY OF THE INVENTION

In accordance with an embodiment, information on a process priority for DB data is previously acquired. When a prefetch or an access control is executed, the system and method take into consideration the information on a process priority. Particularly, if data related to a plurality of DBs exists on the same storage system, deterioration of a process performance of high-priority DBs is prevented by allocating a larger size of cache memory and a higher access ratio to physical storage devices in the storage system to DB data requiring a higher priority according to a process.

Furthermore, when the query execution plan is acquired, a process priority is specified so as to consider process priorities as well as process priorities to data, thereby preventing deterioration of high-priority process performance.

BRIEF DESCRIPTION OF THE DRAWINGS

FIG. 4 is a diagram showing volume physical storage location management information 42 stored in the storage system 10;

FIG. 5 is a diagram showing physical storage device operating information 32 stored in the storage system 10;

FIG. 8 is a diagram showing data structure physical storage location information 712 included in the DBMS data information 40;

FIG. 9 is a diagram showing DBMS execution information 38 stored in the storage system 10;

FIG. 13 is a diagram showing query plan information 880 which is information on a query execution plan supplied to the storage system 10;

FIG. 27 is a diagram showing data structure physical storage location information 712b included in the DBMS data information 40b.

DETAILED DESCRIPTION OF THE EMBODIMENTS

Figure 1:
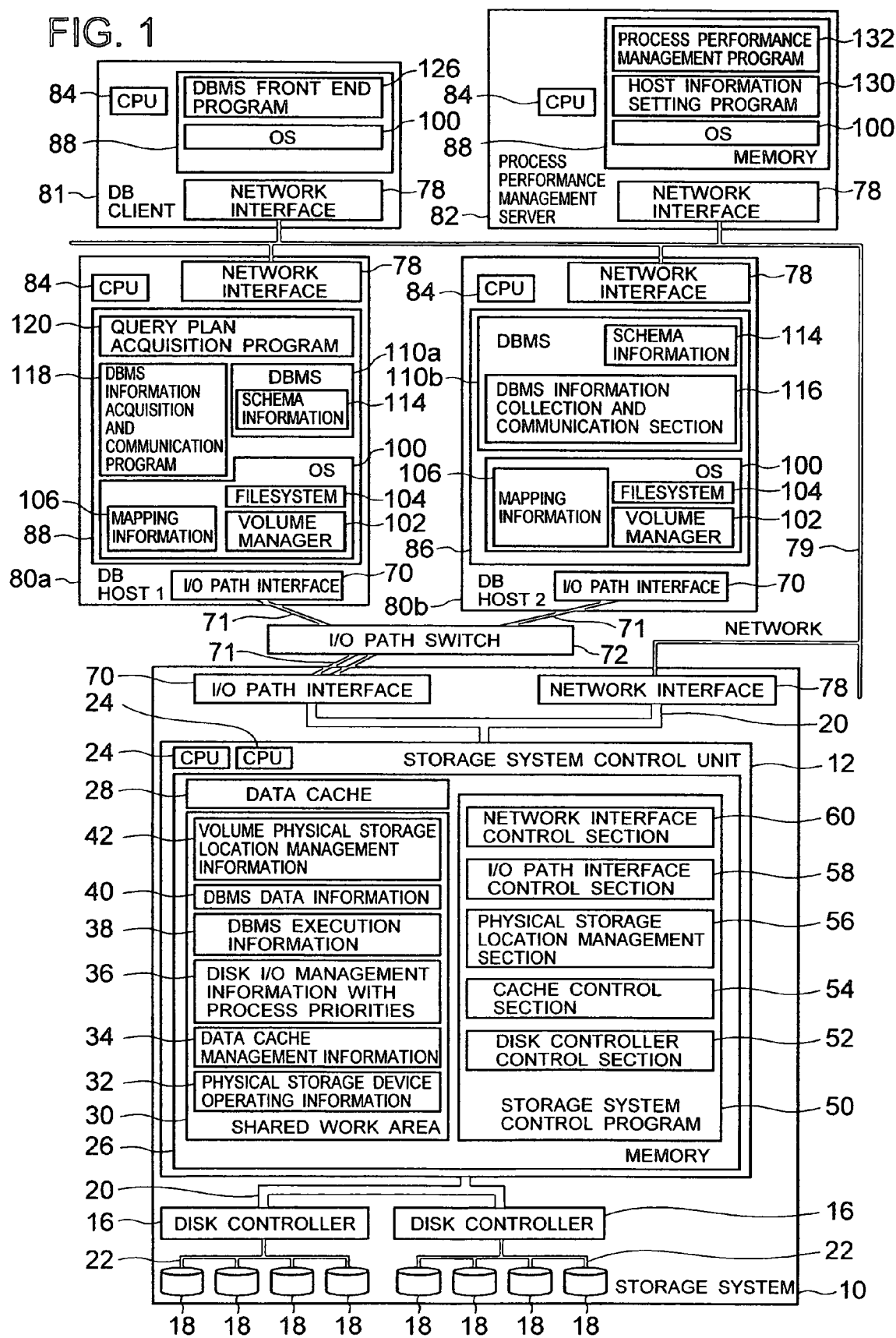
FIG. 1 is a diagram showing a configuration of a computer system according to a first embodiment.

Referring to FIG. 1, there is shown a configurational diagram of the computer system according to the first embodiment of the present invention. The computer system in this embodiment comprises DB hosts 80a and 80b, a DB client 81, a process performance management server 82, and a storage system 10. The DB hosts 80a and 80b, the DB client 81, the process performance management server 82, and the storage system 10 are connected to a network 79 via their own network interfaces 78. Furthermore, the DB hosts 80a and 80b and the storage system 10 are connected to an I/O path switch 72 via an I/O path 71 from their own I/O path interfaces 70 and data is transferred between the storage system 10 and the DB hosts 80a and 80b via them.

While the I/O path 71 for the data transfer between the storage system 10 and the DB hosts 80a and 80b is regarded as different from the network 79 in this embodiment, there has been developed a technology, for example, of executing a data transfer between a computer and a storage system on a network such as an iSCSI and this technology is applicable also in this embodiment. If so, the I/O path interfaces 70 are removed from the storage system 10 and the DB hosts 80a and 80b and the I/O paths 71 and the I/O path switch 72 are removed from the computer system in the arrangement.

The storage system 10 provides a storage area and the storage area is provided externally in units of a volume, which is a storage area management unit and an access or management for a partial area in the volume is executed in units of a block. The storage system 10 comprises the network interface 78, the I/O path interface 70, a storage system control unit 12, a disk controller 16, and a physical storage device 18; the network interface 78, the I/O path interface 70, the storage system control unit 12, and the disk controller 16 are connected to each other via internal buses 20 and the disk controller 16 and the physical storage device 18 are connected to each other via a physical storage device bus 22. The storage system control unit 12 has a CPU 24 and a memory 26.

On the memory 26, a data cache 28 used as a cache memory in the storage system is allocated and a storage system control program 50 which is a program for controlling the storage system is store. Furthermore, the memory 26 stores physical storage device operating information 32 which is operating information of the physical storage device 18, data cache management information 34 which is management information of the data cache 28, disk I/O management information with process priorities 36 which is information about a process priority for DB data managed by DBMSs 110a and 110b and management information taking into consideration of them, DBMS execution information 38 which is a query execution plan executed by the DBMS 110a and 110b in the DB hosts 80a and 80b or execution management information of a prefetch using it, DBMS data information 40 which is information on the DBMSs 110a and 110b in the DB hosts 80a and 80b, and volume physical storage location management information 42 which is management information of a storage location on the physical storage device 18 for physically storing data of volumes provided by the storage system 10.

The storage system 10 in this diagram has a plurality of physical storage devices 18 and therefore data belonging to a single volume can be distributed and allocated to the plurality of physical storage devices 18. It is also possible to use a single physical storage device. The storage system control program 50 includes a disk controller control section 52 for controlling the disk controller 16, a cache control section 54 for managing a data cache 28, a physical storage location management section 56 for performing a process related to a management of a storage location on the physical storage devices 18 for physically storing volumes provided by the storage system 10, an I/O path interface control section 58 for controlling the I/O path interface 70, and a network interface control section 60 for controlling the network interface 78.

Each of the DB hosts 80a and 80b, the DB client 81, and the process performance management server 82 has a CPU 84, a network interface 78, and a memory 88 with an operating system (OS) 100 stored in the memory 88 and executed.

The DB hosts 80a and 80b have their I/O path interfaces 70 to execute an access to a volume provided by the storage system 10. The OS has a filesystem 104, a volume manager 102 for generating a logical volume, which is a logical volume used by the host out of one or more volumes, and mapping information 106 for managing data recording location of a file or a logical volume supplied by the filesystem 104 or the volume manager 102. In addition, the OS 100 may have a raw device mechanism, which is a mechanism for an application to access volumes recognized by the OS 100 or logical volumes provided by the volume manager 102 with an interface equivalent to a file.

While the volume manager 102 exists in the arrangement shown in the diagram, this embodiment is also applicable to an arrangement in which a filesystem uses a volume provided by the storage system 10 without any volume manager 102 because there is no need for changing a configuration of the logical volume in the volume manager 102 in this embodiment.

The DBMSs 110a and 110b are stored and executed on the respective memories 88 of the DB hosts 80a and 80b. The DBMSs 110a and 110b have schema information 114 internally. While only one of the DBMSs 110a and 110b is operating in a single host in this diagram, this embodiment is also applicable to an arrangement in which a plurality of DBMSs are operating in a single host due to a management with an identifier for each of the DBMSs 110a and 110b as described later.

On the DB host 80a, a DBMS information acquisition and communication program 118 and a query plan acquisition program 120 are operating. On the other hand, on the DB host 80b, a DBMS information collection and communication section 116 in the DBMS 110b provides functions provided by the DBMS information acquisition and communication program 118 and the query plan acquisition program 120.

The memory 88 of the DB client 81 stores a DBMS front end program 126 for issuing a process request to the DBMSs 110a and 110b and it is executed there. While the DBMS front end program 126 is operating on a computer different from that of the DB hosts 80a and 80b in this diagram, this embodiment is also applicable to an arrangement in which the program is operating in the DB hosts 80a and 80b.

The memory 88 of the process performance management server 82 stores a host information setting program 130 and a process performance management program 132 and they are executed there. While the host information setting program 130 and the process performance management program 132 are operating on a computer other than those of the DB hosts 80a and 80b and the DB client 81 in this diagram, this embodiment is also applicable to an arrangement in which they are operating on any of the DB hosts 80a and 80b and the DB client 81.

Figure 2:
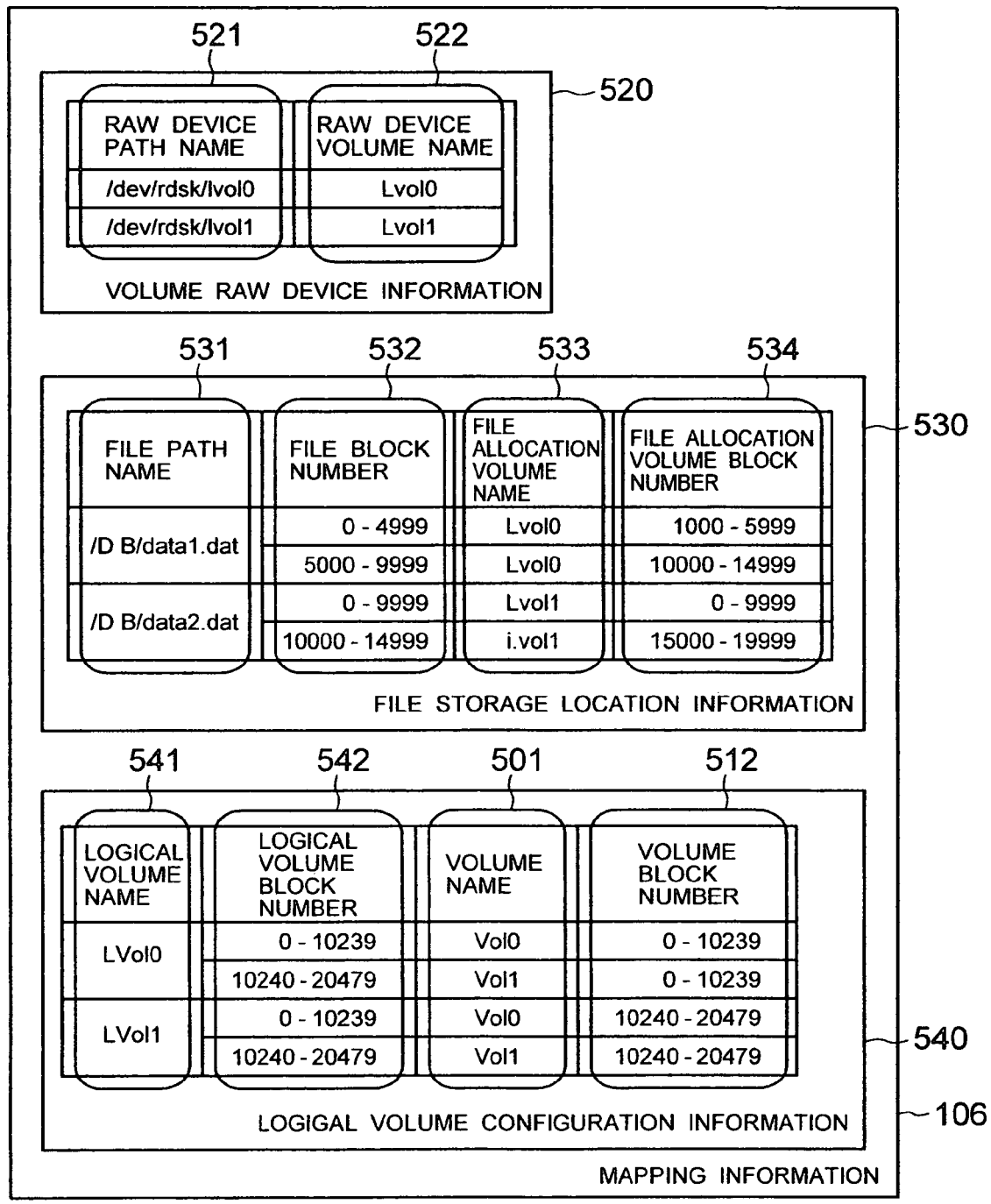
FIG. 2 is a diagram showing mapping information 106 stored in an OS 100 of DB hosts 80a and 80b.

Referring to FIG. 2, there is shown the mapping information 106 stored in the OS 100 of the DB hosts 80a and 80b. The mapping information 106 includes volume raw device information 520, file storage location management information 530, and logical volume configuration information 540. The volume raw device information 520 includes a pair of a raw device path name 521 that is an identifier for specifying a raw device in the OS 100 and a raw device volume name 522 that is an identifier of a volume provided by the storage system 10 accessed by the raw device or a logical volume.

The file storage location information 530 includes sets of file path names 531 each of which is an identifier for specifying a file in the OS 100, file block numbers 532 each of which is a block number for specifying a data location in the file, file allocation volume names 533 each of which is an identifier of a volume provided by the storage system 10 storing data corresponding to it or a logical volume, and file allocation volume block numbers 534 each of which is a data storage location in the volume.

The logical volume configuration information 540 includes sets of logical volume names 541 each of which is an identifier of a logical volume provided by the volume manager 102, logical volume block numbers 542 each of which indicates a location of data on the logical volume, volume names 501 each of which is an identifier of a volume in which the logical block is stored, and volume block numbers 512 each of which is a storage location in the volume. To acquire the mapping information 106, there is a need for executing a management command provided by the OS 100, using an information providing mechanism, or performing a direct analysis of management data, if necessary.

Figure 3:
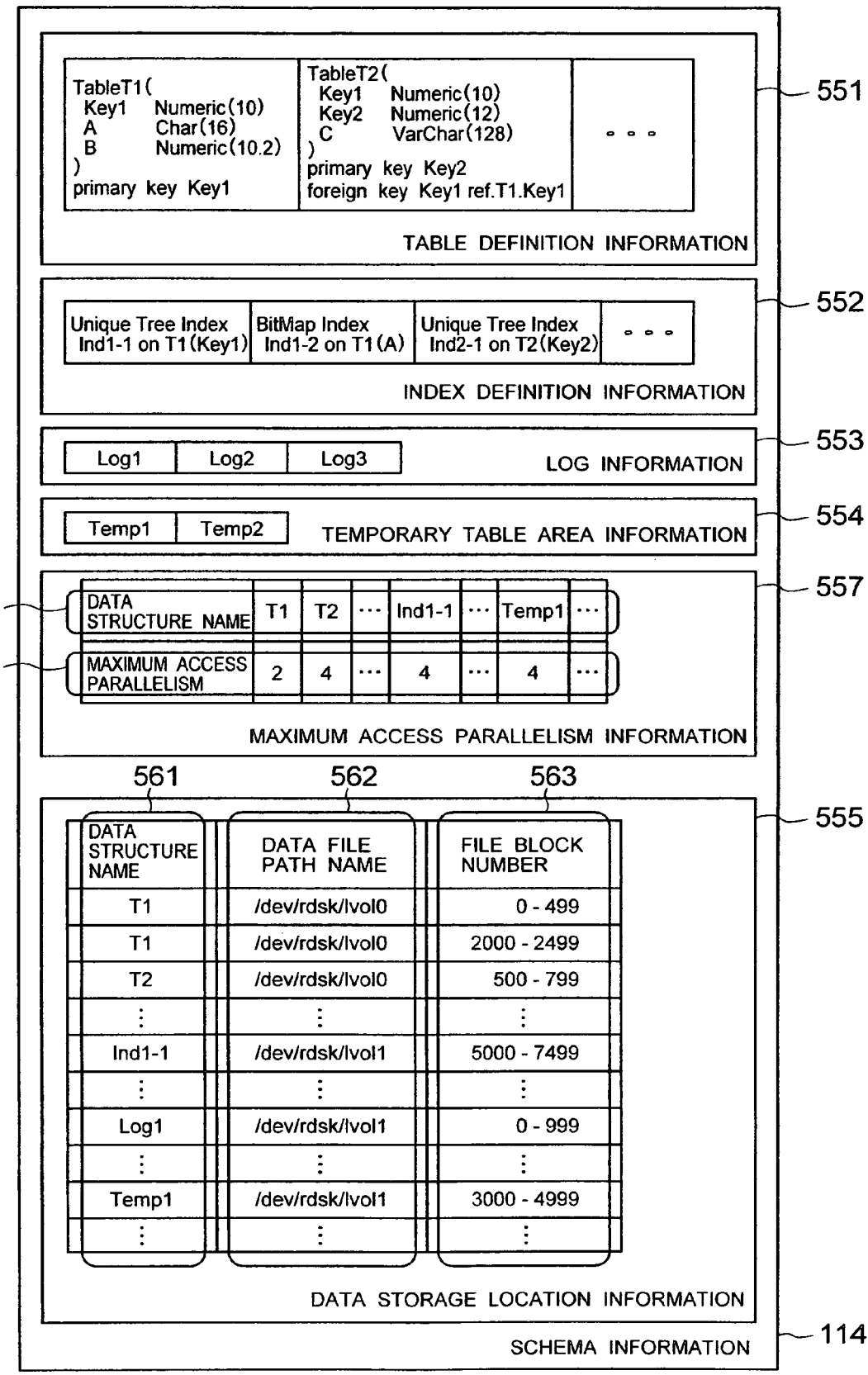
FIG. 3 is a diagram showing schema information 114 including internally defined and managed data and other management information stored in the DBMSs 110a and 110b.

Referring to FIG. 3, there is shown schema information 114 that is data defined and managed internally in the DBMSs 110a and 110b or other management information. The schema information 114 includes table definition information 551 including definition information such as a table data structure or restrictive conditions, index definition information 552 including definition information such as an index data structure or an object table, log information 553 that is information on a log to be used, temporary table area information 554 which is information on a temporary table area to be used, data storage location information 555 which is management information of a data storage location of managed data, and maximum access parallelism information 557 which is information on a degree of parallelism at accessing data.

The data storage location information 555 includes sets of data structure names 561 each of which is an identifier of a data structure such as a table, an index, a log, and a temporary table area, data file path names 562 each of which is an identifier of a file or a raw device for storing the data, and file block numbers 563 each of which is a storage location in it. The maximum access parallelism information 557 includes a pair of a data structure name 561 and maximum access parallelism 569 which is information on the maximum parallelism in a general condition at accessing the data structure. For acquiring the schema information 114 externally, it is possible to acquire information externally published as a management view by using a query language such as a SQL or by using a dedicated mechanism.

Referring to FIG. 4, there is shown the volume physical storage location management information 42 stored in the storage system 10. The volume physical storage location management information 42 includes sets of volume names 501, volume logical block numbers 512 each of which is a data storage location on the volume, physical storage device names 502 each of which is an identifier of the physical storage device 18 storing the logical block, and physical block numbers 514 each of which is a storage location in the physical storage device 18.

Referring to FIG. 5, there is shown the physical storage device operating information 32 stored in the storage system 10. The physical storage device operating information 32 includes sets of volume names 501 each of which is an identifier of a volume provided by the storage system 10, physical storage device names 502 each of which is an identifier of the physical storage device 18 storing data of a volume having the volume name 501, cumulative operating times 503 each of which is a cumulative value from a certain time in an operating time for accessing data stored in the physical storage device 18 having the physical storage device name 502 of the volume having the volume name 501, and old cumulative operating times 593 each of which is a value of the cumulative operating time 503 used at the previous time for calculating operating ratios 594, and operating ratios 594 each of which indicates a ratio of operation time within a certain time period, and a previous cumulative operating time acquisition time 595 which is a time when the previous cumulative operating time is acquired for calculating the operating ratios 594.

The disk controller control section 52 acquires a start time and an end time at a data access to the physical storage device 18 using the disk controller 16, determines to which volume the access data is made, considers a difference between the start time and the end time to be an operating time, and adds it to the cumulative operating time 503 of a set of data having the corresponding volume name 501 and the physical storage device name 502. The disk controller control section 52 performs processing discussed below at fixed intervals. By using the cumulative operating time 503, the old cumulative operating time 593, the previous cumulative operating time acquisition time 595, and the current data acquisition time, an operating ratio 594 between the previous cumulative operating time acquisition time 595 and the current data acquisition time is calculated and stored. After that, the acquired cumulative operating time 503 is stored in the old operating time 593 and the current data acquisition time is stored in the previous cumulative operating time acquisition time 595.

Figure 6:
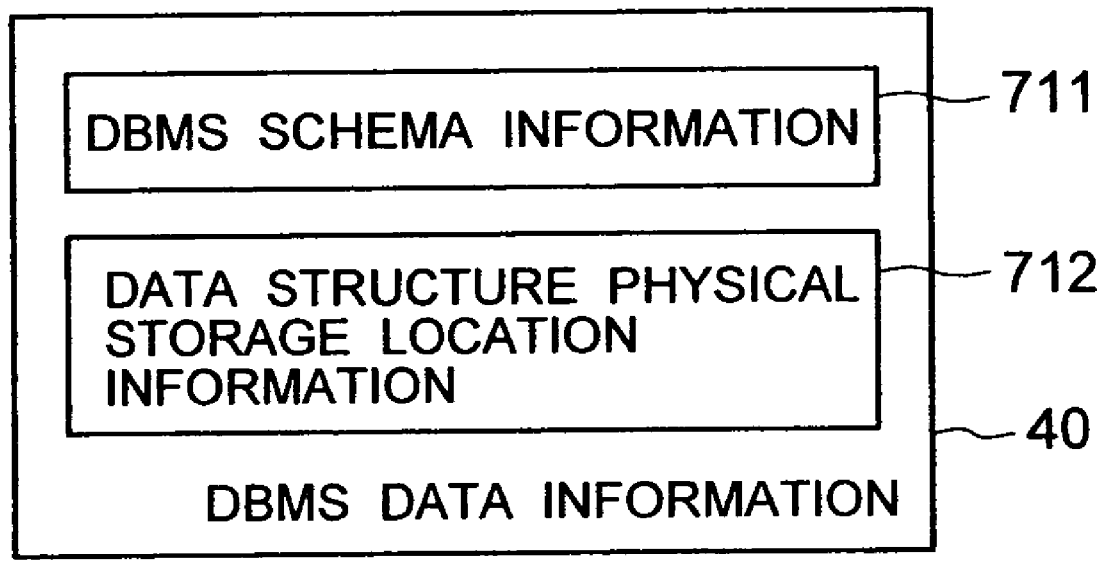
FIG. 6 is a diagram showing DBMS data information 40 stored in the storage system 10.

Referring to FIG. 6, there is shown DBMS data information 40 stored in the storage system 10. The DBMS data information 40 includes DBMS schema information 711 and data structure physical storage location information 712.

Data in the DBMS data information 40 includes those existing in the DB hosts 80*a* and 80*b* and used for processing in the storage system 10. The storage system 10 acquires information existing outside the storage system 10 by using a host information setting program 130 operating in the process performance management server 82. The host information setting program 130 is executed on the DB host 80*a* via the network 79 to collect required information by using the DBMS information acquisition and communication program 118 for collecting required information such as the mapping information 106 and schema information 114 or the DBMS information collection and communication section 116 for performing a function equivalent to that of the DBMS information acquisition and communication program 118 in the DBMS 110*b* executed on the DB host 80*b*.

After acquiring the information, the host information setting program 130 processes data for setting information to the storage system 10, if necessary, and transfers it to the storage system 10 via the network 79. In the storage system 10, network interface control section 60 confirms that required information is received, passes it to the cache control section 54, and stores the information in an appropriate place in the DBMS data information 40 after required data processing.

As discussed above, the host information setting program 130 can be executed on an arbitrary DB host 80*a* or 80*b*. In addition, the cache control section 54 can have an information collecting function of the host information setting program 130. In these conditions, the information can be transferred from the DB host 80*a* or 80*b* through the I/O path 71. If so, the storage system 10 provides the DB host 80*a* or 80*b* with a special volume in which writing into a specified area has a specific meaning; if writing is made in such volume, the I/O path interface control section determines that information is transferred, passes the information to the cache control section 54, and stores the information into an appropriate place in the DBMS data information 40 after required data processing.

As for the information collection process, it is possible to use two types of methods; a method of issuing a data transfer request externally when the storage system 10 requires the data and a method of sending changed data to the storage system 10 from the outside whenever the data is changed. The query execution plan in the DBMS 110*a* and 110*b*, however, need be received when a process to be executed is cleared, and therefore the storage system 10 must receive ones given by the process performance management program 132, the query plan acquisition program 120, or the DBMS 110*b* passively.

Figure 7:
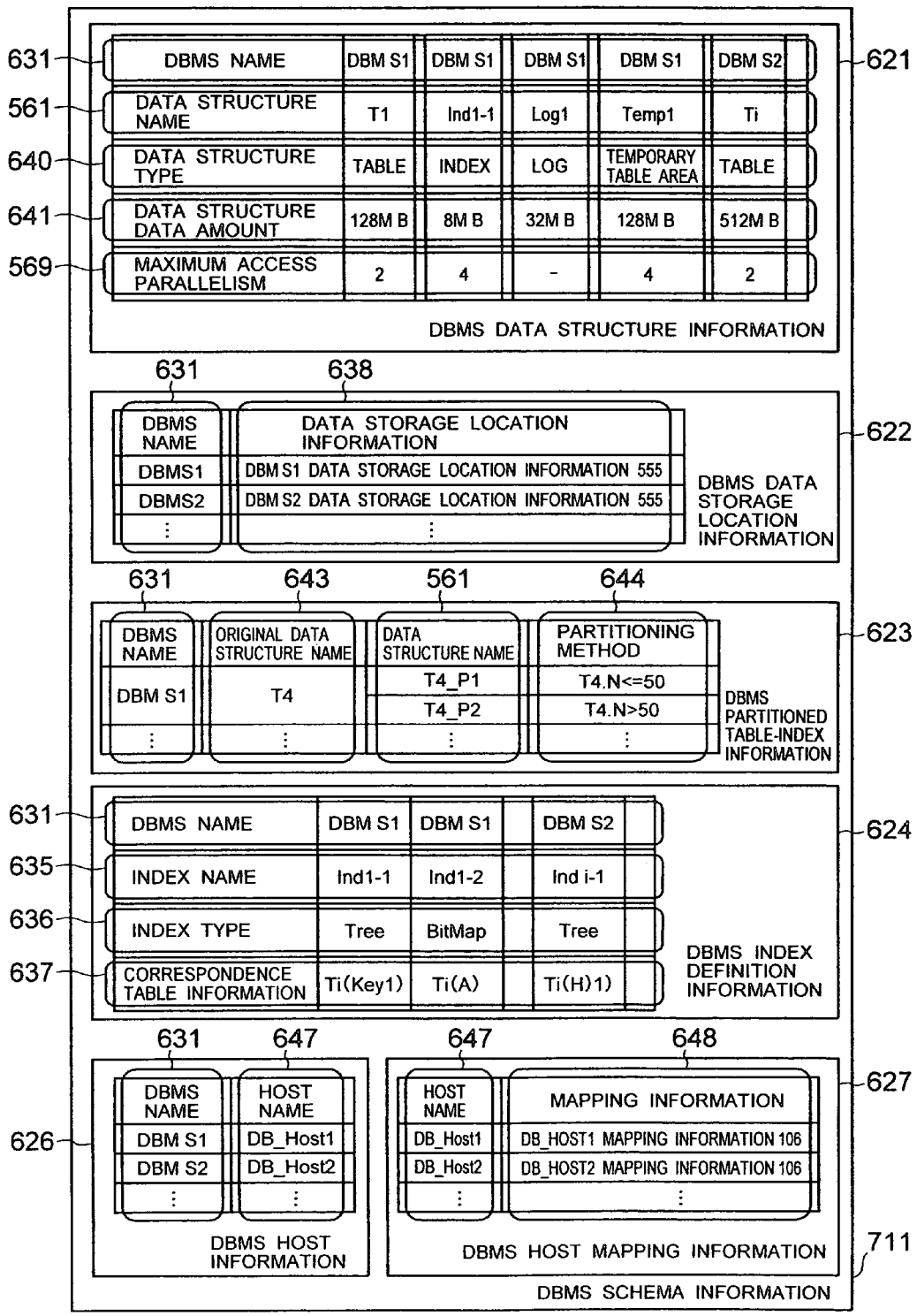
FIG. 7 is a diagram showing DBMS schema information 711 included in the DBMS data information 40.

Referring to FIG. 7, there is shown DBMS schema information 711 included in the DBMS data information 40. The DBMS schema information 711 includes DBMS data structure information 621, DBMS data storage location information 622, DBMS partitioned table-index information 623, DBMS index definition information 624, DBMS host information 626, and DBMS host mapping information 627. The DBMS data structure information 621 is information on a data structure defined in the DBMSs 110*a* and 110*b*, including sets of DBMS names 631 each of which is an identifier of the DBMSs 110*a* and 110*b*, data structure names 561 each of which is an identifier of a data structure of a table, an index, a log, a temporary table area, or the like in the DBMSs 110*a* and 110*b*, data structure types 640 each of which indicates a type of the data structure, data structure data amounts 641 each of which indicates an amount of total data used by the data structure calculated from the data storage location information, and maximum access parallelisms 569 each of which is information on the maximum degree of parallelism at accessing the data structure. In this condition, some data structures do not have a value of the maximum access parallelism.

The DBMS data storage location information 622 includes sets of DBMS names 631 and data storage location management information 638 which is data storage location management information 555 in the DBMS. The DBMS partitioned table-index information 623 is information for managing a data structure in which a single table or index is partitioned into some groups according to an attribute value, including sets of DBMS names 631 each of which is an identifier of the DBMS 110a or 110b to which the partitioned data structure belongs, original data structure names 643 each of which is an identifier of the data structure before the partitioning, and data structure names 561 each of which is an identifier of the data structure after the partitioning, and partitioning methods 644 including the partitioning conditions. Hereinafter, regarding a partitioned data structure, a structure simply referred to as data structure is assumed to be a data structure after the partitioning, unless otherwise specified.

The DBMS index definition information 624 includes sets of DBMS names 631, index names 635 each of which is an index identifier, index types 636 each of which indicates a data format of the index, and correspondence table information 637 indicating which attribute and which table the index corresponds to. The DBMS host information 626 is for use in managing the host where the DBMS 110a or 110b having the DBMS name 631 is being executed, including sets of DBMS names 631 and host names 651 each of which is an identifier of a DBMS execution host.

The DBMS host mapping information 627 is information collected from the mapping information 106 stored in the OS 100 of the DB hosts 80a and 80b, comprising sets of host names 651 and mapping information 648 including the mapping information 106 in the host. The DBMS host information 626 is set by an administrator in system configuration information. Other data in the DBMS schema information 711 is generated by acquiring required information out of the schema information 114 managed by the DBMSs 110a and 110b and mapping information 106 in the host 80a and 80b.

Referring to FIG. 8, there is shown the data structure physical storage location information 712 included in the DBMS data information 40. The data structure physical storage location information 712 is for use in managing in which physical storage device 18 and in which area the data structure included in the DBMS 110a or 110b is stored in the storage system 10, including sets of DBMS names 631 and data structure names 561 for specifying a data structure, data structure block ID numbers 716 each of which is an ID number of a block in the data structure, volume names 501 and volume block numbers 512 for indicating an area externally accessed, and physical storage device names 502 and its physical block number 514 for indicating a storage location on the physical storage device 18. This information is generated by combining corresponding parts with referring to the DBMS data storage location information 622 and the DBMS host mapping information 627 in the DBMS schema information 711 and the volume physical storage location main information 510.

A sequential access method is defined for each of the DBMSs 110a and 110b. The data structure physical storage location information 712 includes data sorted in such a way that an access order at a sequential access is maintained for each data structure specified by the DBMS name 631 and the data structure name 561. Then, the data structure block ID number 716 is assigned according to the sequential access order for each data structure. In this embodiment, types of the object DBMSs 110a and 110b are limited and a program for generating the data structure physical storage location information 712 previously grasps a sequential access method in the DBMS 110a or 110b and generates data sorted in the sequential access order.

The sequential access method in the DBMS 110a or 110b according to this embodiment is assumed to conform to the following method. If data having a certain data structure is sequentially accessed, the data file name 562 at which the data structure is stored and the file block number 563 are sorted in ascending order and the access is executed in this order. As for other methods of determining a sequential access method, there are a method of accessing in the order of sorting a set of an internal ID number for a data file management and a file block number 563 in ascending order and the like, and it is possible to make a decision of any of these sequential access methods.

Referring to FIG. 9, there is shown the DBMS execution information 38 stored in the storage system 10. The DBMS execution information 38 includes execution information ID management information 800 for managing currently effective execution information, DBMS process plan information 805 including an access method of data generated based on the acquired query execution plan, sequential prefetch information 810 which is management information at executing a prefetch to the sequential access, B-Tree index prefetch information 820 that is management information at executing a prefetch with interpreting the B-Tree index, and data structure access information 825 used for grasping an access pattern at executing the prefetch.

The execution information ID management information 800 includes sets of execution information ID 801 each of which is an identifier of execution information, DBMS names 631 each of which is an identifier of the DBMS 110a or 110b implementing a process indicated by the execution information, query plan IDs 802 each of which is an identifier of a query plan used for generating the execution information, query priorities 803 each of which is a process priority of the query, and DBMS cache management IDs 811 each of which is an ID of management information of cache for a prefetch executed based on the execution information. If each entry value is effective, the entry is valid. If not, the entry is invalid.

The DBMS process plan information 805 includes sets of execution information IDs 801, execution information internal ID numbers 806 for managing an inside of execution information, data structure names 561 identified from the query execution plan, execution orders 807 each of which is an access order to a data structure in the query execution plan identified from the query execution plan, and access types 808 each of which is an access method to the data structure. This information is set based on information on a query execution plan described later.

The sequential prefetch information 810 includes sets of execution information IDs 801 and execution information internal ID numbers 806 for specifying an entry of the DBMS process plan information, DBMS cache management IDs 811 each of which is an identifier of a management area for a cache for a prefetch, a data area range 812 indicating an area of a data structure in which the prefetch is executed according to the prefetch management information, prefetch pointers 813 for managing an extent to which the prefetch is executed, and access conditions 814 each of which indicates a condition of a real access from the host to the prefetch area. A range of the area indicated by the data area range 812 is shown by using the data structure block ID number 716. The access condition 814 contains either "not executed," which means that an access is not executed by the host, or "executed," which means that an access is made by the host.

The B-Tree index prefetch information 820 includes sets of execution information IDs 801 and execution information internal ID numbers 806 for specifying an entry of the DBMS process plan information, DBMS cache management IDs 811 each of which is an identifier of a management area of a cache for a prefetch, and selection conditions 821 each of which includes a condition of data selected by the index. 78 The data structure access information 825 includes sets of DBMS names 631 and data structure names 561 for specifying a data structure, and data access information 826 each of which is a certain number of pieces of the latest access history information for each data structure. In the data access information 826, the data structure block ID number 716 is used for an access destination. In addition, the access destination is paired with an access size and they are managed in the FIFO (First In First Out) algorithm.

Figure 10:
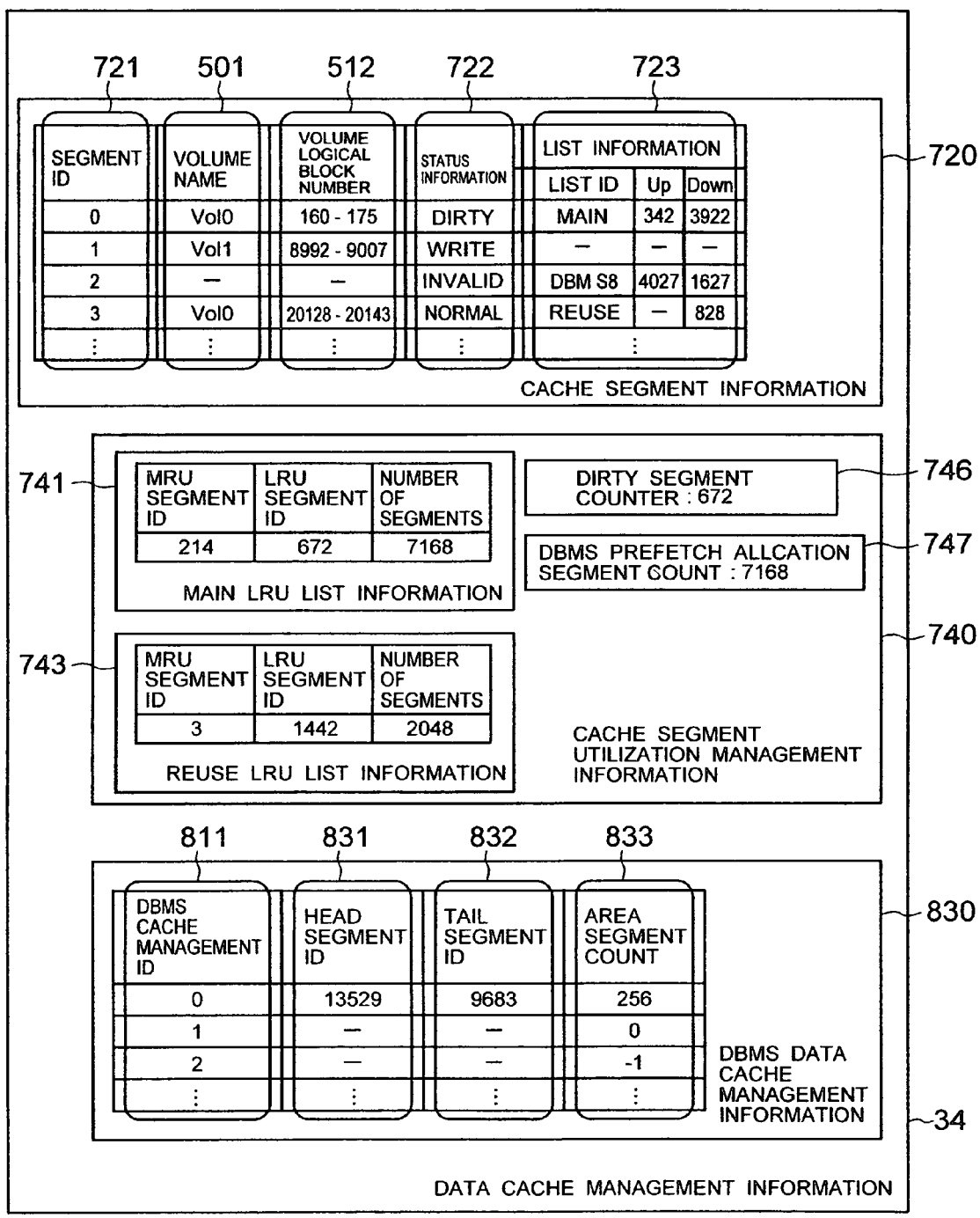
FIG. 10 is a diagram showing data cache management information 34 stored in the storage system 10.

The storage system 10 manages data caches in management units referred to as segment which is an area having a certain size. Referring to FIG. 10, there is shown the data cache management information 34 stored in the storage system 10. The data cache management information 34 includes cache segment information 720 indicating a segment state of the data cache 34, cache segment utilization management information 740 used for selecting cache segments to be reused, and DBMS data cache management information 830 for managing cache segments allocated for a prefetch execution using the DBMS execution information 38.

The cache segment information 720 includes sets of segment IDs 721 each of which is an identifier of a segment, volume names 501 and volume logical block numbers 512 each of which indicates a data area stored in the segment, status information 722 each of which indicates a segment status, and list information 723 each of which is information of a list used for a segment management described later.

There are segment statuses indicated by the status information 722; "normal" indicating that the same data as for the data in the segment is stored in the physical storage device 18, "dirty" indicating that the latest data exists only in the segment, "write" indicating that a write request is being issued for data in the segment, and "invalid" indicating that no valid data exists in the segment. At the list information 723, an identifier of a list which the segment currently belongs to and link information of the list are stored. In this diagram, the list is assumed to be a doubly linked list.

To manage selecting cache segments to be reused, the cache segment utilization management information 740 includes main LRU list information 741, reuse LRU list information 743, as management information for two types of management lists, a dirty segment counter 746 indicating the number of segments whose status information 722 in the current cache segment information 720 is set to "dirty," and DBMS prefetch allocation segment count 747 indicating the number of cache segments allocated for an execution of a prefetch using the DBMS execution information 38. Each of the main LRU list information 741 and the reuse LRU list information 743 includes an MRU (Most Recently Used) segment ID indicating a head of the list, an LRU (Least Recently Used) segment ID indicating a tail of it, and the number of segments belonging to the list.

The DBMS data cache management information 830 includes sets of DBMS cache management IDs 811 each of which is an identifier of an entry, head segment IDs 831, tail segment IDs 832, and area segment counts 833 each of which indicates a head segment, a tail segment, and the number of segments on a list managed by this entry. It is determined whether the entry is being used by a value of the area segment count 833; if the value is 0 or greater, the entry is determined to be in use, while, if it is a negative value, the entry is determined to be not used.

Figure 11:
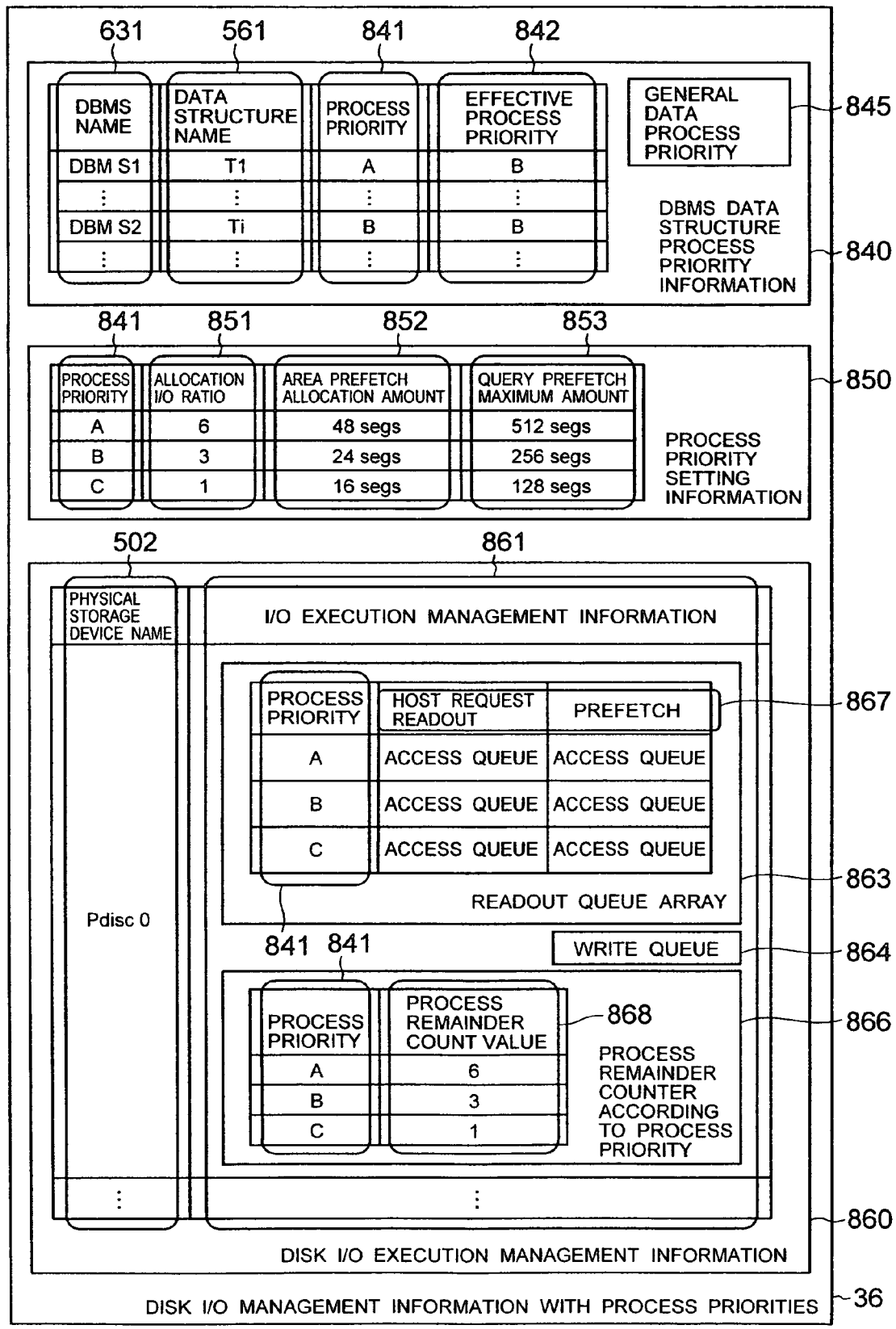
FIG. 11 is a diagram showing disk I/O management information with process priorities 36 stored in the storage system 10.

Referring to FIG. 11, there is shown the disk I/O management information with process priorities 36 stored in the storage system 10. The disk I/O management information with process priorities 36 includes DBMS data structure process priority information 840 which is information on a process priority of a data structure, process information setting information 850 used for a control based on a process priority allocated to the data structure, and disk I/O execution management information 860 used for a management of issuing an I/O request to the disk controller 16 when a data access is executed to the physical storage device 18.

The DBMS data structure process priority information 840 includes sets of DBMS names 631 and data structure names 561 for specifying a data structure, process priorities 841 each of which is a process priority of a default given to the data structure, and effective process priorities 842 each of which is a process priority of the data structure considering the query priority 803 in the execution information managed by using the DBMS execution information 38, and a general data process priority 845 which is a process priority given to an access to other general data not belonging to the data structure.

The process information setting information 850 includes sets of process priorities 841, allocation I/O ratios 851 each of which is a ratio of the number of inputs and outputs to the physical storage device 18 allocated to the process priority, area prefetch allocation amounts 852 each of which indicates the number of cache segments allocated for a prefetch for each query in an area having the process priority, and query prefetch maximum amounts 853 each of which indicates the maximum value of the number of cache segments allocated for a prefetch to a query determined to have the process priority.

The disk I/O execution management information 860 includes sets of physical storage devices 502 each of which is an identifier of the physical storage device 18 and I/O execution management information 861 for use in managing disk I/O issues to the devices. The I/O execution management information 861 includes a read queue array 863 which is a queue array for retaining read access requests, a write queue 864 which is a queue for retaining write access requests, and process remainder counter according to a process priority 866 for use in managing an allocation of the number of inputs and outputs for each process priority.

For an access to the read queue array 863, it is required to specify a process priority 841 and an access queue in which an access should be made by using a specifier 867 indicating whether it is for responding to a host access request or for executing a prefetch. The process remainder counter according to a process priority 866 includes sets of process priorities 841 and process remainder count values 868 each of which indicates the number of accessible remaining processes at the corresponding process priority.

The following section describes a control method in the storage system 10 using a query execution plan. The DBMS 110a or 110b has a function of externally providing a query execution plan indicating what kind of process is internally executed and what order is used for the execution to obtain a result of the process when it is supplied. By giving the query execution plan obtained by this function to the storage system I 0, the storage system 10 can grasp what kind of process is just to be executed in the DBMS 110*a* or 110*b*. Higher access performance is obtained by prefetching data into the data cache 28 in advance using the information or by grasping data on the data cache 28 which will not be accessed any more during execution of the process and preferentially reusing cache segments retaining the above data.

Figure 12:
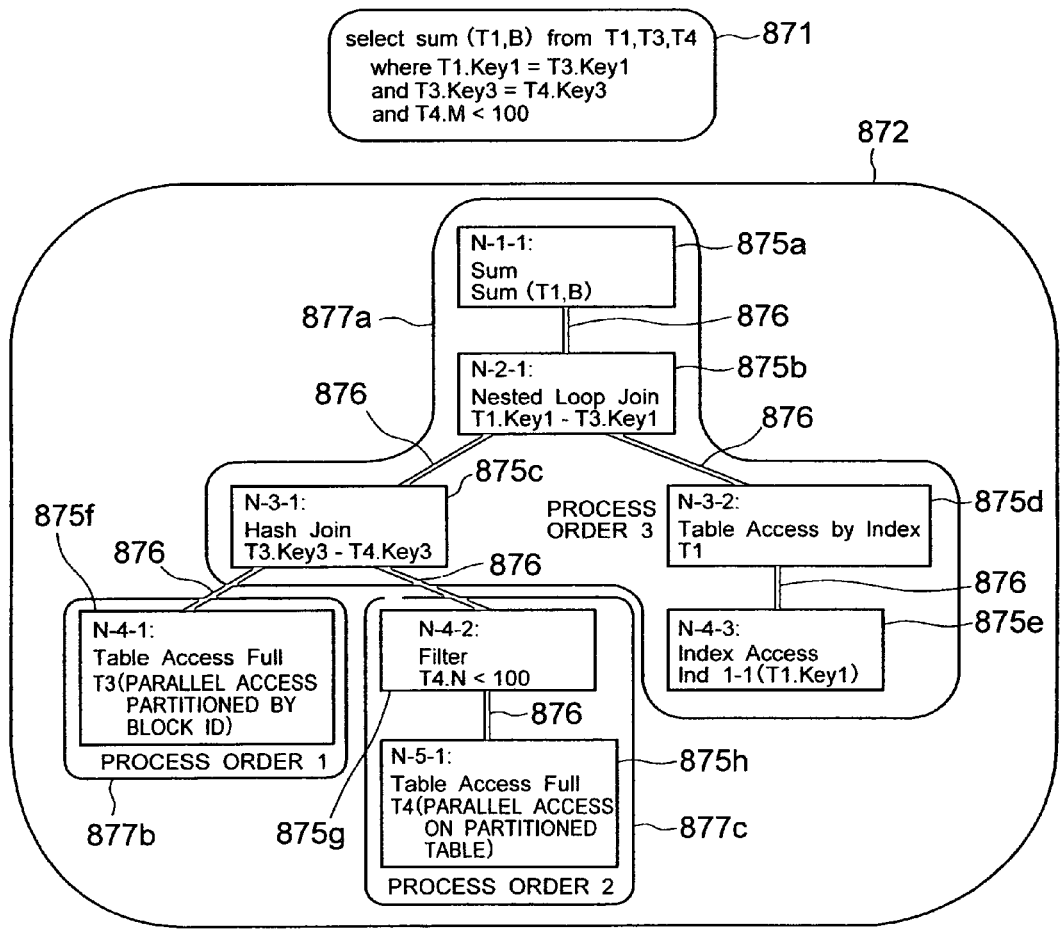
FIG. 12 is a diagram showing a query 871 and a query execution plan 872 generated by the DBMS 110a for realizing the process.

As an example of a query execution plan, FIG. 12 shows a query 871 and a query execution plan 872 generated by the DBMS 110*a* to execute the process. As shown in this diagram, the query execution plan 872 can be represented by a tree structure with nodes as subdivided processes executed internally to obtain the result of the query 871. In this diagram, data flows from a leaf toward a root. Process nodes 875*a*, 875*b*, 875*c*, 875*d*, 875*e*, 875*f*, 875*g*, and 875*h* represent subdivided processes executed in the query 861 and branches 876 indicate data flow relations between the processes. Process groups 877*a*, 877*b*, and 877*c* represent sets of processes likely to be executed at a time in the DBMS 110*a*; only after a completion of all processes belonging to a single process group, processes belonging to another process group are executed.

An execution order of the processes in a process group depends on a content of processes in the process group and a data flow used for these processes. In the query execution plan 872, a table T3 is full-scanned by the process group 877*b*, first. Subsequently, the process group 877*c* is executed to scan a table T4 entirely and to select a set of tuples where the value of attribute M is smaller than 100 on the basis of a result of the scanning. This table full scanning is executed concurrently with the data selection according to the value of attribute M. Subsequently, a process of the process group 877*a* is executed. The process results of the process group 877*b* and the process group 877*c* are submitted to a hash join operation. By using this result an index Ind1-1 is referred to execute a nested-loop join for retrieving corresponding data in a table T1 and to obtain a total sum of attributes B on the table T1 from this result. The processes in the process group 877*a* are concurrently executed.

Referring to FIG. 13, there is shown query plan information 880 which is information on a query execution plan supplied to the storage system 10 after the query execution plan 872 is generated. The query plan information 880 includes a DBMS name 631 which is an identifier of the DBMS 110*a* or 110*b* where a process having the query execution plan is executed, a query plan ID 802 which is an identifier of the query execution plan, a query priority 803 which is a process priority supplied to the process having the query execution plan, and query execution plan information 881 having detailed information on the query execution plan.

The query execution plan information 881 includes identifiers 883 of process nodes 875 where the query execution plan 872 is represented by a tree structure, identifiers 884 of their parent process nodes 875, node process contents 885 implemented in the process nodes 875 such as hash join, nested-loop join, sort-merge join, table full scan, table access, index access, filter, sort, sum and the like, access data structures 886 each of which is a data structure name 561 of an access target used for a process of accessing to a data structure in the process node 875, a process order 887 indicating an execution order of processes between the process groups 877 to which the process nodes 875 belong, and node process details 888 which is detailed information of processes to be executed in the process nodes 875 such as join conditions in a join operation, selection conditions in an index access, and a data partitioning method at a data parallel access. For the access data structure 886, a null value is entered in an entry corresponding to the entry other than an access to data in the node process content 885. The node process details 888 need not always be included.

When the storage system 10 receives the query plan information 880, a process procedure as discussed below is applied if the DBMS front end program 126 on the DB client 81 has issued a process request to the DBMS 110*a*. First, the DBMS front end program 126 requests the query plan acquisition program 120 of executing the process on the DBMS 110*a* via the network 79. At this time, the query priority 803 is also specified. In addition, the query plan acquisition program 120 generates identification information for identifying the DBMS front end program 126 when the process is requested.

The query plan acquisition program 120 acquires a query execution plan 872 of the process which the DBMS front end program 126 requested from the DBMS 110*a* and then sends the specified query priority 803, the DBMS name 631 of the DBMS 110*a* executing the process, identification information of the DBMS front end program 126, the acquired query execution plan 782, and the query plan ID 802 which is an identifier of the query execution plan 872 added by the query plan acquisition program 120 to the process performance management program 132 on the process performance management server 82 via the network 79. The process performance management program 132 which has received the query execution plan 872 and other information determines the query priority 803 given to the storage system 10 on the basis of the acquired query priority 803, the identification information of the DBMS front end program 126, and other process priority settings, generates the query plan information 880 by using other acquired information, and sends it to the storage system 10 via the network 79.

After sending the query execution plan 872 and other information to the process performance management program 132, the query plan acquisition program 120 sends the process requested by the DBMS front end program 126 to the DBMS 110*a*. The query plan acquisition program 120 acquires the result and then returns it to the DBMS front end program 126.

After that, it informs the process performance management program 132 of a completion of the process executed according to the query execution plan 872 identified by the DBMS name 631 and the query plan ID 802 via the network 79. The process performance management program 132 informed of the completion of the process corresponding to the query execution plan 872 informs the storage system 10 of the completion of the process corresponding to the query plan information 880 identified by the DBMS name 631 and the query plan ID 802 via the network 79.

While the query plan acquisition program 120 is operating on the DB host 80*a* where the DBMS 110*a* is operating in the above example, an arbitrary computer, in other words, it can be operating on any of the DB hosts 80*a* and 80*b*, the DB client 81 and other computers. In addition, the DBMS front end program 126 can include a function of the query plan acquisition program 120.

In the DBMS 110*b*, the DBMS information communication section 106 of the DBMS 110*b* serves as the query plan acquisition program 120. If the front end program 126 on the DB client 81 issues a process request to the DBMS 110*b*, the process procedure is as described below. First, the DBMS front end program 126 requests the DBMS 110*b* of an execution of the process via the network 79. At this time, it also specifies the query priority 803. In addition, the DBMS 110*b* generates identification information of the DBMS front end program 126 when it is requested of the process.

The DBMS 110b generates the query execution plan 872 to the process requested by the DBMS front end program 126 and sends the specified query priority 803, the DBMS name 631 of the DBMS 110b, identification information of the DBMS front end program 126, the generated query execution plan 872, and the query plan ID 802 which is an identifier of the query execution plan 872 added by the DBMS 110b to the process performance management program 132 on the process performance management server 82 via the network 79 by using the DBMS information communication section 106.

The process performance management program 130 which has received the query execution plan 872 and other information determines the acquired query priority 803, identification information of the DBMS front end program 126, and the query priority 803 supplied to the storage system 10 on the basis of other process priority settings, generates the query plan information 880 by using other acquired information, and sends it to the storage system 10 via the network 79.

The DBMS 110b executes the requested process after sending the information to the process performance management program 132 and then returns the result to the DBMS front end program 126. Subsequently, it informs the process performance management program 132 of a completion of the process executed according to the query execution plan 872 identified by the DBMS name 631 and the query plan ID 802 via the network 79 by using the DBMS information communication section 106. The process performance management program 132 informed of the completion of the process corresponding to the query execution plan 872 informs the storage system 10 of the completion of the process corresponding to the query plan information 880 identified by the DBMS name 631 and the query plan ID 802 via the network 79.

The process performance management program 132 can operate on an arbitrary computer in the computer system, in other words, on any of the DB hosts 80a and 80b and the DB client 81. In the above described method, the query plan acquisition program 120 or the DBMS 110b send the information to the process performance management program 132 once and generate the query plan information 880 and supply it to the storage system 10 there.

Instead, the query plan acquisition program 120 or the DBMS 110b can generate the query plan information 880 directly and send it to the storage system 10. If so, the DB host 80a or 80b can transfer the information via the I/O path 71. In this condition, the storage system 10 having a special volume where writing into a specific area has a specific meaning is provided for the DB host 80a or 80b; if any data is written into the volume, the I/O path interface control section determines that information is transferred.

While information received by the storage system 10 is the query execution plan information 881 in the query plan information 880 related to the execution plan of the query in the above method, the process performance management program 132 can generate and send the DBMS process plan information 805, sequential prefetch information 810, and content of the B-Tree index prefetch information 820 set to the DBMS execution information 38. If so, arbitrary values can be set to the execution information ID 801, the DBMS cache management ID 811, the prefetch pointer 813, and the access condition 814. For generating methods of the above information, the same methods are applied as for the settings in the storage system 10 and they will be discussed later.

Figure 14:
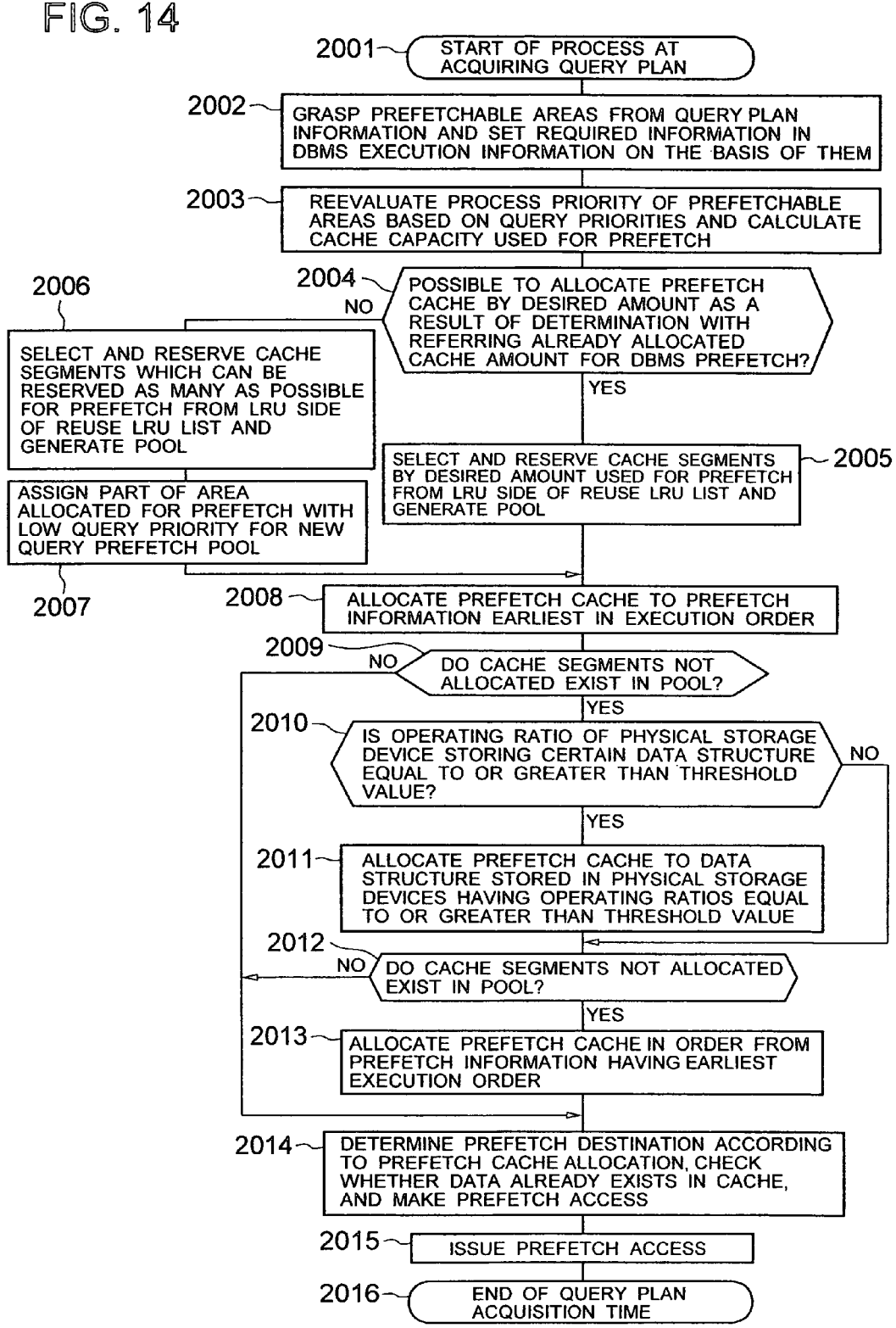
FIG. 14 is a diagram showing a processing flow used when the storage system 10 has received the query plan information 880.

The following describes a process when the storage system 10 just received the query plan information 880 via the network 79 or I/O path 71. Referring to FIG. 14, there is shown a processing flow used when it has received the query plan information 880. If the network interface 78 receives the query plan information 880, the network interface control section 60 informs the cache control section 54 of receiving the query plan information 880; if the I/O path interface 70 receives the query plan information 880, the I/O path interface control section 58 informs the section 54 of the receiving, by which the cache control section 54 starts the process. In step 2001, the process is started.

In step 2002, prefetchable areas are grasped on the basis of the acquired query plan information 880 and required information is set in the DBMS execution information 38. First, a free entry is found in the execution information ID management information 800 to acquire the execution information ID 801 to store the execution information and settings are made there including the DBMS name 631, the query plan ID 802, and the query priority 803 on the basis of the query plan information 880. Further, a free entry should be found in the DBMS data cache management information 830 to set the DBMS cache management ID 811.

Subsequently, an area of segment count in an entry having the DBMS cache management ID in the DBMS data cache management information 830 is set to 0, that is, the entry is set to "busy." In the subsequent process executed when the storage system 10 received the query plan information 880, a value of the DBMS name 631, in the query plan information 880 is used as a value to target and the acquired execution information ID 801 and the DBMS name 631 are put in states that they can always be referenced in this process.

Next, the DBMS process plan information 805 is set on the basis of the query execution plan information 881. Entries where an effective value is put in the access data structure 886 in the query execution plan information 881 are selected for this information and they are sorted in descending order in the process order 887. Furthermore, regarding entries having the same value in the process order 887, they are sorted in such a way that those accessed earlier are arranged earlier correspondingly by checking dependence between data according to the plan node name 883, the plan parent node name 884, and the node process content 885 by reading data on the table after accessing the index or the like.

The contents of the entries of the query execution plan information 881 are set in the DBMS process plan information 805 so that the execution information internal ID numbers 806 are assigned according to the result of the sorting. A value of the access data structure 886 is set to the data structure name 561 and that of the process order 887 is set to the execution order 807.

The access type 808 is set as described below. First, a content of the data structure corresponding to an entry of the query execution plan information 881 is grasped from the DBMS name 631 and the access data structure 886. If the data structure is a tree-structured index, "Tree-structured index" is set to the corresponding access type 808; if the data structure is a table, data dependence in the query execution plan information 881 is checked. If an access is made based on a result of accessing the tree-structured index, "tree-structured index reference" is set; if not, "sequential" is set there.

Next, the sequential prefetch information 810 is set. The sequential prefetch information 810 is set to an entry where "sequential" is set to the access type 808 among entries previously set in the DBMS process plan information 805. First, the entry where "sequential" is set to the access type 808 is fetched. The data structure name 561 is fetched from the entry under checking in the DBMS process plan information 805. Assuming the DBMS name 631 and the data structure name 561 to be index names 635, it is checked whether the data structure is a bitmap index by referring to the DBMS index definition information 624; if so, none is set to the sequential prefetch information 810.

In the DBMS 110a or 110b, it is assumed that the data structure is partitioned equally in a sequential order according to the maximum access parallelism 569 and that they are accessed in parallel. The DBMS data structure information 621 is referenced by using the DBMS name 631 and the data structure name 561 to obtain the maximum access parallelism 569 in the data structure. The substructures are generated by the amount equivalent to a value of the maximum access parallelism 569 for an entry having the execution information ID 801 and the execution information internal ID number 806 currently under setting in the sequential prefetch information 810. The data structure physical storage location information 712 is referred to by using the DBMS name 631 and the data structure name 561, the data structure block ID numbers 716 of all areas where the data structure is stored, the data structure is partitioned equally by the value of the maximum access parallelism 569 acquiring them, and they are set to the data area range 812 of the entry in the sequential prefetch information 810 currently under generation.

Subsequently, in each entry, a head of the value set to the data area range 812 is set to the prefetch pointer 813 and "not executed" is set to the access condition 814. Furthermore, a free entry is searched for in the DBMS data cache management information 830 and its DBMS cache management ID 811 is set. Then, value 0 is set to the area segment count 833 of an entry having the selected DBMS cache management ID 811 in the DBMS data cache management information 830.

Finally, a setting is made for the B-Tree index prefetch information 820. The B-Tree index prefetch information 820 is generated for an entry where an accessed data structure is a tree structure among entries in the previously set DBMS process plan information 805. First, an entry where "Tree structured index" is set to the access type 808 is fetched. The execution information internal ID number 806 of the entry is fetched and then the entry in the query execution plan information 881 corresponding to currently checking entry in the DBMS process plan information 805 is identified to check the content of the node process details 888.

Unless the content includes any condition for accessing the tree-structured index, none is set for the B-Tree index prefetch information 820. If the content of the node process details 888 includes a condition for accessing the tree-structured index and if the condition depends on a result of the previous process, none is set for the B-Tree index prefetch information 820. Unless the condition depends on the result, an entry is generated in the B-Tree index prefetch information 820 to make settings of the execution information ID 801 of the entry in the DBMS process plan information 805 currently under checking and the execution information internal ID number 806 in the entry.

Then, the condition for accessing the tree structure index is set to the selection condition 821. Subsequently, a free entry is found in the DBMS data cache management information 830 and then the DBMS cache management ID 811 is set there. After that, "0" is set to the area segment count 833 of the entry having the selected DBMS cache management ID 811 in the DBMS data cache management information 830.

In step 2003, the number of the cache segments for use in the prefetch process is calculated and its additional processes are performed. First, the query priority 803 is obtained by referring to the execution information ID management information 800 from the execution information ID 801 currently under setting. Subsequently a set of data structure names 561 for access execution are obtained by referring to the DBMS process plan information 805 from the execution information ID 801 currently under setting. For all the obtained data structure names 561, the process priority information 841 is obtained by referring to the DBMS data structure process priority information 840.

Process priorities of the data structures in this process are obtained by using a predetermined rule on the basis of the above value and the previously obtained query priority 803. If the process priority in this process is higher than that of the data structures obtained by referring to the effective process priority information 842 in the DBMS data structure process priority information 840, the effective process priority information 842 is updated to a value of the process priority in this process.

On each entry in the sequential prefetch information 810 having the execution information ID 801, the data structure name 561 is obtained by referring to the entry in the DBMS process plan information 805 which has the same execution information ID 801 and the same execution information internal ID number 806 and the area prefetch allocation amount 852 is obtained from the process priority setting information 850 according to the previously obtained data structure process priority corresponding to this data structure in this process, thereby considering it as a prefetch allocation amount to the entry of the sequential prefetch information 810.

Subsequently, on each entry of the B-Tree index prefetch information 820 having the execution information ID 801, the data structure name 561 is obtained by referring to the entry in the DBMS process plan information 805 which has the same execution information ID 801 and the execution information internal ID number 806, and the area prefetch allocation amount 852 is obtained from the process priority setting information 850 according to the previously obtained data structure process priority corresponding to this data structure in this process, thereby considering it as a prefetch allocation amount to the entry of the B-Tree index prefetch information 820.

There is obtained a total sum of the prefetch allocation amounts to all entries of the sequential prefetch information 810 and the B-Tree index prefetch information 820 having the execution information ID 801. The highest priority value is obtained among the previously obtained data structure process priorities in this process and the query prefetch maximum amount 853 obtained with referring to the process priority setting information 850 by using this highest priority value is compared with the total sum of the prefetch allocation amounts, thereby determining that a smaller value is a desired value of a prefetch cache capacity in this query.

In step 2004, it is checked whether the prefetch cache can be allocated by the amount of the previously determined desired value. Then, it is checked whether the sum of the DBMS prefetch allocation segment count 747 and the previously determined desired value is lower than a predetermined threshold. If it is lower than the threshold, it is determined that the prefetch cache can be allocated and the control proceeds to step 2005; if not, it is determined that the cache with desired amount cannot be allocated and the control proceeds to step 2006.

In the step 2005, cache segments are selected by the amount of the previously determined desired value and removed from the LRU side of the reuse LRU list and the cache segment information 720 and the reuse LRU list information 743 are updated accordingly. A new list is generated from the selected cache segments, the execution information ID management information 800 is referred to so as to obtain the DBMS cache management IDs 811 corresponding to the execution information IDs 801 for them, the head segment ID 831, the tail segment ID 832, and the area segment count 833 in the previously generated list are stored in the corresponding entries, and the cache segment information 720 is updated. This list is used to manage a pool of cache segments used for a prefetch. Next, the control proceeds to step 2008.

In the step 2006, cache segments that can be reserved are determined and removed from the reuse LRU list and the reuse LRU list information 743 and the cache segment information 720 are updated accordingly. A new list is generated from the selected cache segments, the execution information ID management information 800 is referenced to obtain the DBMS cache management IDs 811 corresponding to the execution information IDs 801 for them, the head segment ID 831, the tail segment ID 832, and the area segment count 833 in the previously generated list are stored in the corresponding entries, and the cache segment information 720 is updated. This list is used to manage a pool of cache segments used for a prefetch.

In step 2007, the query priority 803 in the query plan information 880 is obtained and it is checked whether there is execution information having a priority lower than this by referring to the execution information ID management information 800; if so, cache segments reserved by the execution information with lower priority are reassigned to execution information currently under setting. The execution information with query priorities lower than those of the execution information currently setting are checked in ascending order from the lowest one to examine the amount of segments in prefetch cache segment pool managed by the entries of the DBMS data cache management information 830 identified by the corresponding DBMS cache management IDs 811 in the execution information ID management information 800; if there are segments there, they are passed to the currently secured prefetch cache pool and the DBMS data cache management information 830 is updated accordingly.

When the previously determined desired value of cache segments are accumulated in the prefetch cache pool corresponding to the execution information currently under setting or when all segments existing in the pool of the prefetch cache are collected in the execution information having priorities lower than the query priority 803 in the query plan information 880, the process in this step is completed and the control proceeds to step 2008. In case, however, segments are not accumulated up to the previously determined desired value even if all segments existing in the pool of the prefetch cache are collected in the execution information having priorities lower than the query priority 803 in the execution information currently under setting, it is possible to add a process of bringing cache segments having data already prefetched by execution information having lower query priorities into the pool of the prefetch cache corresponding to the execution information currently under setting.

In the step 2008, a prefetch cache is allocated to a data structure indicated by an entry having the earliest value of the execution order 807 among entries having the execution information ID 801 currently under setting. The execution information internal ID number 806 of the entry having the earliest value of the execution order 807 is obtained among the entries having the execution information ID 801 currently under setting. There may be a plurality of the corresponding execution information internal ID numbers 806. The execution information ID management information 800 is referred to by using the execution information ID 801 and the corresponding DBMS cache management ID 811 is obtained to acquire the prefetch pool information. For the entries in the sequential prefetch information 810 corresponding to the execution information ID 801 and the execution information internal ID number 806, cache segments are allocated by the pre-determined amount of a first prefetch execution from the pool, the DBMS cache management IDs 811 in the entries are obtained from the sequential prefetch information 810, and updating is performed on entries of the DBMS data cache management information 830 corresponding to the pool and the entries.

For the entries of the B-Tree index prefetch information 820 corresponding to the execution information ID 801 and the execution information internal ID number 806, an area of a single segment is allocated, the DBMS cache management ID 811 in the entries are obtained from the B-Tree index prefetch information 820, and updating is performed on entries of the DBMS data cache management information 830 corresponding to the pool and the entries. At this point, prefetch cache segments should be passed to all the prefetch information. If the amount of cache segments in the pool is insufficient to supply them into all candidate entries, a cache amount is adjusted for being allocated to each candidate entry in the sequential prefetch information 810 so that almost equal cache segment count is allocated in all entries.

In step 2009, it is checked whether there is a free segments in the prefetch pool. First, the corresponding DBMS cache management ID 811 is obtained with referring to the execution information ID management information 800 by using the execution information ID 801 to acquire prefetch pool information. Then, it is checked whether there is any cache segments not allocated for the prefetch in the prefetch pool. If there is, the control proceeds to step 2010; if not, it proceeds to step 2014.

In step 2010, it is checked whether there is any operating ratio equal to or greater than a certain threshold value in those of the physical storage devices 18 storing data having a prefetchable data structure. The execution information internal ID numbers 806 are obtained for entries where a prefetch buffer is not allocated yet in those of the sequential prefetch information 810 and the B-Tree index prefetch information 820 having the execution information ID 801 currently under setting. The DBMS process plan information 805 is referred to by using a set of the obtained execution information ID 801 and the execution information internal ID number 806 to obtain the data structure names 561 of the data structures to which the prefetch cache is not allocated yet.

The data structure physical storage location information 712 is referred to by using a set of the DBMS name 631 of the execution schedule currently under setting and the obtained data structure name 561 to obtain a set of the volume name 501 and the physical storage device name 502 where they are stored. The physical storage device operating information 32 is referred to by using the obtained volume name 501 and physical storage device name 502 to obtain the latest operating information among the operating ratio 594 in the corresponding entry; if the value is equal to or greater than the predetermined threshold, it is determined that the prefetch should be performed in an early stage for the data structure corresponding to the retrieved volume name 501 and physical storage device name 502. If at least one data structure is found among all of the checked data structures, the control proceeds to step 2011; If not, it proceeds to step 2012.

In the step 2011, a prefetch cache is allocated to the data structure for which it is determined that the prefetch should be performed in an early stage in the step 2010. Entries in the sequential prefetch information 810 or the B-Tree index prefetch information 820, with which the sets of the volume name 501 and the physical storage device name 502 having an operating ratio 594 exceeding the threshold in the step 2010 are searched for, are obtained. Subsequently, prefetch caches are allocated to the corresponding entries in the same method as in the step 2008 and then the control proceeds to step 2012.

In the step 2012, it is checked whether there is a free segments in the prefetch pool in the same method as in the step 2009. If there is, the control proceeds to step 2013; if not, it proceeds to step 2014.

In the step 2013, a prefetch cache is allocated to prefetch information to which no prefetch cache is allocated yet. Among entries of the sequential prefetch information 810 and the B-Tree index prefetch information 820 having the execution information ID 801 currently under setting, the execution information internal ID numbers 806 of those to which no prefetch buffer is allocated yet are extracted. The execution order 807 corresponding to the smallest execution information internal ID number 806 among them is obtained by referring to the DBMS process plan information 805.

After obtaining the execution information ID 801 currently under setting in the DBMS process plan information 805 and the execution information internal ID number 806 of the entry having the obtained execution order 807, an entry having the execution information internal ID number 806 obtained here is selected out of entries to which no prefetch buffer is allocated yet in those of the sequential prefetch information 810 and the B-Tree index prefetch information 820 having the previously obtained execution information ID 801 currently under setting. In these entries, prefetch caches are allocated to the corresponding entries in the same method as in the step 2008.

Subsequently, it is checked whether the prefetch pool has a free area in the same method as in the step 2009. If it has, the prefetch cache allocation process based on this execution order 807 is repeated until there remains no free area in the prefetch pool and then the control proceeds to step 2014.

In the step 2014, a prefetch access destination is determined for the prefetch cache segments having been allocated until then. This process is executed according to the whether the prefetch destination data already exists in the data cache 28, check result. For entries to which prefetch caches are allocated among the entries of the sequential prefetch information 810 having the execution information ID 801 currently under setting, first, cache segments of the cache allocation amount for prefetching are assigned to the area from the beginning of the area of the data area range 812. Then, the prefetch pointer 813 is advanced by the cache allocation amount.

The execution information ID 801 and the execution information internal ID number 806 in those entries are obtained and then the DBMS process plan information 805 is referred to by using the set of values to obtain the corresponding data structure name 561. Then, a set of volume name 501, the volume logical block number 512, the physical storage location name 502, and the physical block number 514, where the corresponding data are stored, is obtained by referring to the data structure physical storage location information 712 with the obtained data structure name 561, the DBMS name 631 currently under setting, and the data structure block ID number 716 as the access destination previously assigned from the beginning of the data area range 812.

The cache segment information 720 is referred to with the volume name 501 and the volume logical block number 512 to check whether the corresponding block already exists on the data cache 28. If the data exists, no prefetch request is generated and the cache segments for it are returned to the pool. If segments having the data exist in the reuse LRU list, the management entry of cache segment with the data is replaced with the segment assigned prefetch and the segment assigned for prefetch is returned to cache pool for prefetching. In this case, updating is performed on the cache segment information 720 and, if necessary, corresponding entries in the reuse LRU list information 743 and the DBMS cache management information 830.

If there is no data on the data cache 28, the a prefetch access request is generated from the obtained physical storage device 18, the physical block number 514, and the read destination segment ID 721. This prefetch access request includes the access destination DBMS name 631 and the data structure name 561.

For entries to which a prefetch chache is allocated in the B-Tree index prefetch information 820 having the execution information ID 801 currently under setting, the root data of the tree structure index corresponding to the entry should be prefetched. The execution information ID 801 and the execution information internal ID number 806 in the entry are obtained and then the DBMS process plan information 805 is referred to with the set of data to obtain the corresponding data structure name 561 to specify an index.

By referring to the DBMS data storage location information 622, the DBMS host information 626, and the DBMS host mapping information 627 with the obtained data structure name 561 and the DBMS name 631 currently under setting, the volume name 501 and the volume logical block number 512 of an area having the tree structure index root data are obtained by utilizing a knowledge of the DBMSs 110a and 110b.

The cache segment information 720 is referred to with the obtained volume area information to check whether the corresponding block already exists on the data cache 28. If data exists, the data is interpreted and the selection condition 821 in the entries of the B-Tree index prefetch information 820 and other required mapping information are referred for obtaining the volume name 501 and the volume logical block number 512 of the next accessed data.

Subsequently, grasping the next accessed data by interpreting data and checking the existence on the data cache 28 are repeated until no data exists on the data cache 28. If all data exists on the data cache 28 within a data interpretable range, the cache segments allocated for the prefetch are returned to the prefetch pool. If any data not existing on the data cache 28 is found, a prefetch of the data is performed. As described above, only a cache segment is assigned for the prefetch of data corresponding to the entry of the B-Tree index prefetch information 820. If root data of the tree structured index exists on the data cache 28, it is possible that the access destination spreads into a plurality of areas as a result of the data interpretation.

If there is a need for prefetching a plurality of areas, the execution information ID management information 800 is referred to with the execution information ID 801 to acquire prefetch pool information by obtaining the corresponding DBMS cache management ID 811 and to check whether there are enough free cache segments to satisfy the request in the pool. If there are enough segments, a required amount of segments are assigned to prefetch data of the B-Tree index; If not, all available segments are assigned to prefetch B-Tree index data. Then, values of the corresponding entries in the DBMS data cache management information 830 and the cache segment information 720 are updated. Unless the prefetch cache can be allocated to all prefetchable areas, the prefetch cache is allocated to areas, giving preference to areas closer to the root data with regarding the number of data interpretation stages as a distance.

After the prefetch destinations are determined, a set of the physical storage device name 502 and the physical block numbers 514 corresponding to the volume names 501 and the volume logical block numbers 512 are obtained by referring to the volume physical storage location management information 42 and a prefetch access request is generated with the obtained values and specified segment ID 721 for read destination. This access request includes the DBMS name 631 and the data structure name 561 of the access destination.

At this point, regarding the cache segments to which the prefetch destination is allocated, the volume name 501 and the volume logical block number 512 of the corresponding entry in the cache segment information 720 are updated so as to indicate an area to which the cache segments are allocated on the basis of the sequential prefetch information 810 or the B-Tree index prefetch information 820 and then a value of the status information 722 is set to "Invalid."

In step 2015, a prefetch access is issued on the basis of the prefetch access request generated in the step 2014. To all prefetch access requests, the process priorities 841 are obtained by referring the DBMS data structure process priority information 840 with the DBMS names 631 and the data structure names 561 in the requests and process priorities of this data structure in this process are obtained by using a predetermined rule on the basis of the above values and the query priorities 803 of the execution information currently under setting.

Considering the obtained process priorities to be process priorities 841 and specifying "prefetch" for the specifier 867, access requests are added to the corresponding queue in the read queue array 863 in the I/O execution management information 861 corresponding to the physical storage device name 502 which is the prefetch destination. A control of executing accesses to the physical storage device 18 of the access requests added to the queue will be described later.

In step 2016, the processing flow is completed for the process at acquiring the query plan information 880.

Figure 15:
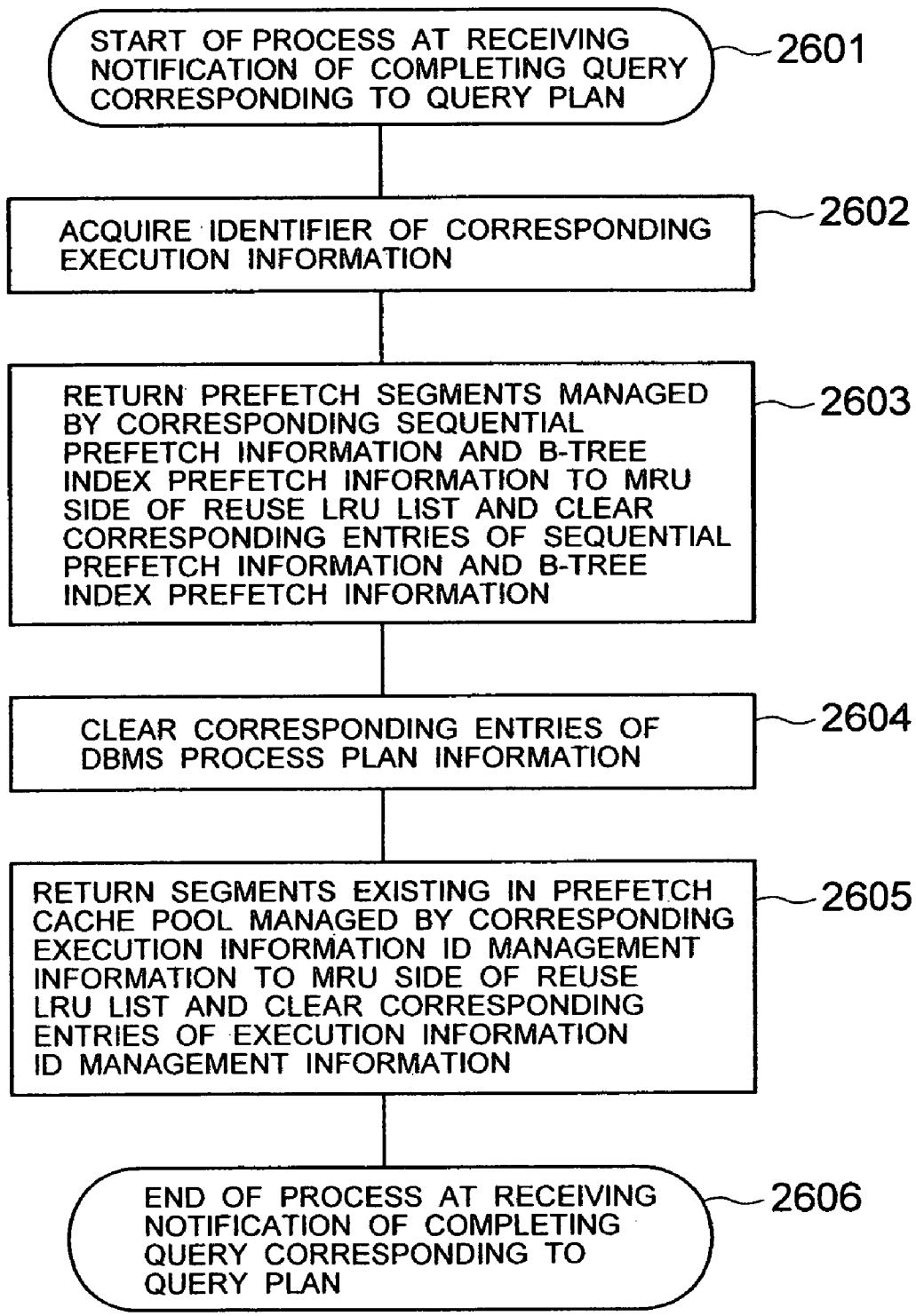
FIG. 15 is a diagram showing a processing flow used when the storage system 10 has received a notification of completing a query corresponding to the query plan information 880.

Referring to FIG. 15, there is shown a processing flow at receiving a notification of a completion of a query corresponding to the query plan information 880. In this flow, the network interface control section 60, if the network interface 78 receives the notification, or the I/O path interface control section 58, if the I/O path interface 70 receives it, informs the cache control section 54 of receiving the completion notification of the query corresponding to the query plan information 880, by which the cache control 54 starts the process. In step 2601, the process is started. At this point, to identify the completed query, the DBMS name 631 and the query plan ID 802 are provided.

In step 2602, the execution information ID management information 800 is referred to by using the provided DBMS name 631 and query plan ID 802 to obtain the corresponding execution information ID 801.

In step 2603, the sequential prefetch information 810 and the B-Tree index prefetch information 820 are referred to by using the obtained execution information ID 801 to obtain the corresponding entry. The DBMS cache management IDs 811 in the corresponding entries are obtained to acquire a prefetch data management link managed by entries corresponding to them in the DBMS data cache management information 830, all cache segments existing in the management link are linked anew to the MRU side of the reuse LRU list, and the corresponding portions in the reuse LRU list information 743 and the cache segment information 720 are updated correspondingly.

Furthermore, null values are assigned to the head segment ID 831 and the tail segment ID 832 of an entry in the DBMS data cache management information 830 corresponding to the previously obtained DBMS cache management ID 811 and "−1" is assigned to the area segment count 833 to nullify the entry. After that, all entries cleared in the sequential prefetch information 810 and the B-Tree index prefetch information 820 corresponding to the previously obtained execution information ID 801.

In step 2604, all entries are cleared in the DBMS process plan information 805 corresponding to the previously obtained execution information ID 801.

In step 2605, the corresponding DBMS cache management ID 811 is obtained in the execution information ID management information 800 by using the previously obtained execution information ID 801 to acquire a management link of the prefetch cache pool managed by the entries in the DBMS data cache management information 830 corresponding to it, all cache segments existing in the management link are linked anew to the MRU side of the reuse LRU list, and the corresponding portions in the reuse LRU list information 743 and the cache segment information 720 are updated correspondingly. Furthermore, the entries of the DBMS data cache management information 830 corresponding to the previously obtained DBMS cache management ID 811 are nullified in the same manner as in the step 2603. After that, the entries are cleared in the execution information ID management information 800 corresponding to the previously obtained execution information ID 801.

In step 2606, the process is completed.

Figure 16:
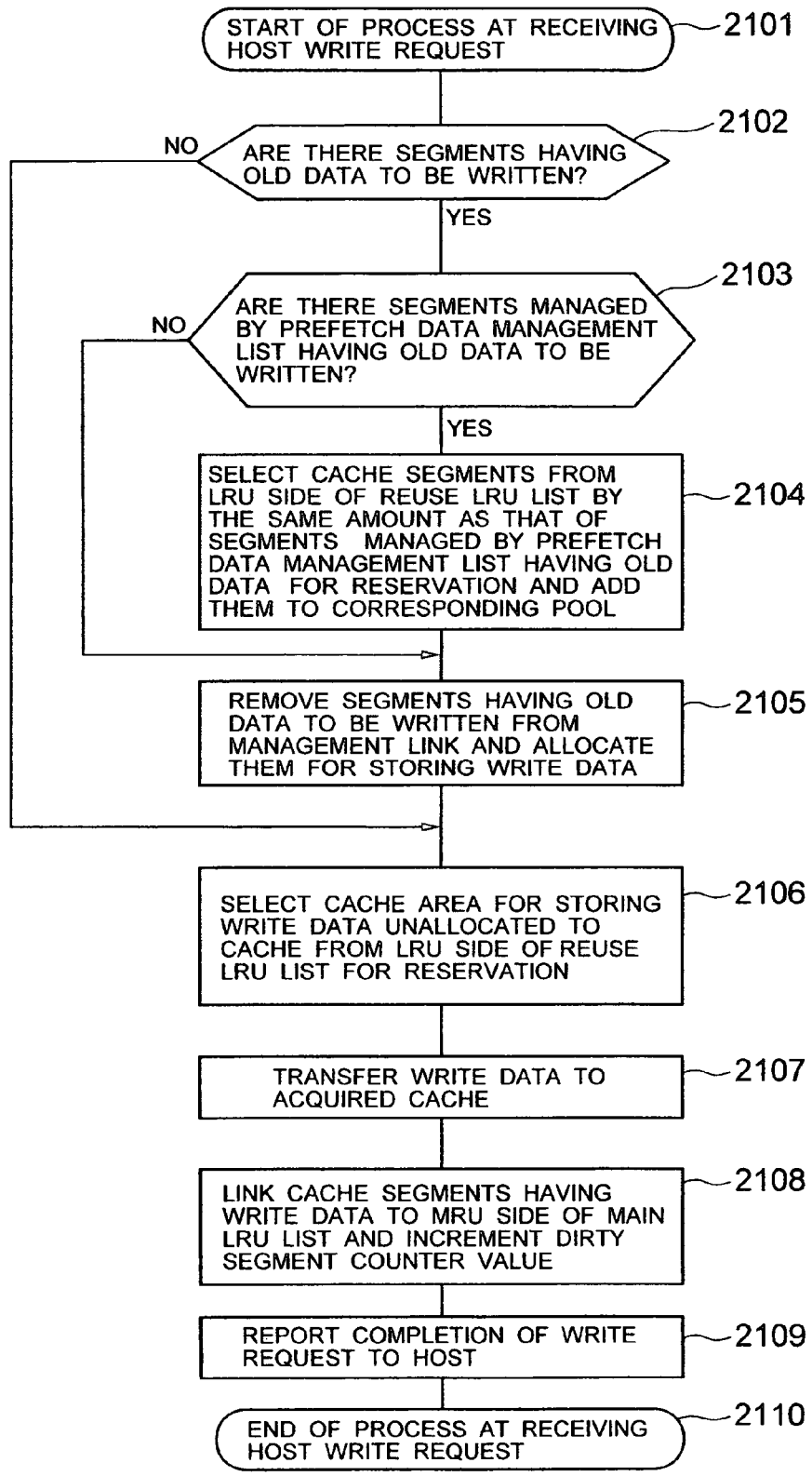
FIG. 16 is a diagram showing a processing flow used when the storage system 10 has received a write access request from the DB host 80a or 80b.

Referring to FIG. 16, there is shown a processing flow used when the storage system 10 received a write access request from the DB host 80a or 80b via the I/O path 71. When the write request arrives at the I/O path interface 70 via the I/O path 71, the I/O path interface control section 58 informs the cache control section 54 of the request and the cache control section 54 starts the process. In step 2101, the process is started. At this point, an access destination specification from the DB host 80a or 80b is indicated by the volume name 501 and the volume logical block number 512.

In step 2102, it is checked whether old data exists on the data cache 28. This check is performed by referencing the cache segment information 720 by using the write destination volume name 501 and the volume logical block number 512 and obtaining the corresponding entry. If even a single segment exists, the control proceeds to step 2103; if not, it proceeds to step 2106.

In the step 2103, it is checked whether the cache segment having the existing old data exists in the prefetch management list. This check is made by referencing the status information 722 and the list information 723 in the entries of the previously obtained cache segment information 720 and examining the identifier and condition of the list to which it belongs. If even a single segment exists, the control proceeds to step 2104; if not, it proceeds to step 2105.

In the step 2104, a prefetch cache pool is adjusted, which is involved by the write process. As a write destination, the same number of cache segments as those existing in the prefetch management list having the old data are selected out of the reuse LRU list for reservation. Then, for each segment having the old data of the write destination, the DBMS cache management ID 811 indicating a management area in the DBMS data cache management information 830 for managing an identifier of a list to which the segment with old data belongs from the identifier, it is used to obtain a corresponding entry of the sequential prefetch information 810 or the T-Tree index prefetch information 820 for managing prefetch segments, and the execution information ID 801 in the entry is used to reference the execution information ID management information 800, thereby obtaining the DBMS cache management ID 811 of the prefetch pool.

In the step 2106, cache segments are assigned to data that has not been allocated yet to write destination cache segments. Cache segments of the amount required to store unallocated data is reserved from the LRU side of the reuse LRU list and entries are updated correspondingly in the cache segment information 720 and the reuse LRU list information 743.

In step 2107, data transmitted from the DB host 80a or 80b is transferred to the acquired data cache.

In step 2108, update of the cache management information after writing is performed. First, regarding the cache segments having old data, the states are checked by the status information 722 in the corresponding entries of the cache segment information 720 and then the number of "dirty" items is obtained. Furthermore, the dirty segment counter 672 is incremented by the number of cache segments used as a write destination minus the number of "dirty" items of the previously obtained old data.

Then, the status information 722 of the entries corresponding to the write destination segments in the cache segment information 720 are set to "dirty." After that, the cache segments used as the write destination are linked to the MRU side of the main LRU list and entries are updated correspondingly in the cache segment information 720 and the main LRU list information 741.

In step 2109, a request is made to the I/O path interface control section 58 to report a completion of the write process into the DB host 80a or 80b and the I/O path interface control section 58 reports the completion of the process to the DB host 80a or 80b via the I/O path 71 using the I/O path interface 70.

In step 2110, the process is completed.

Figure 17:
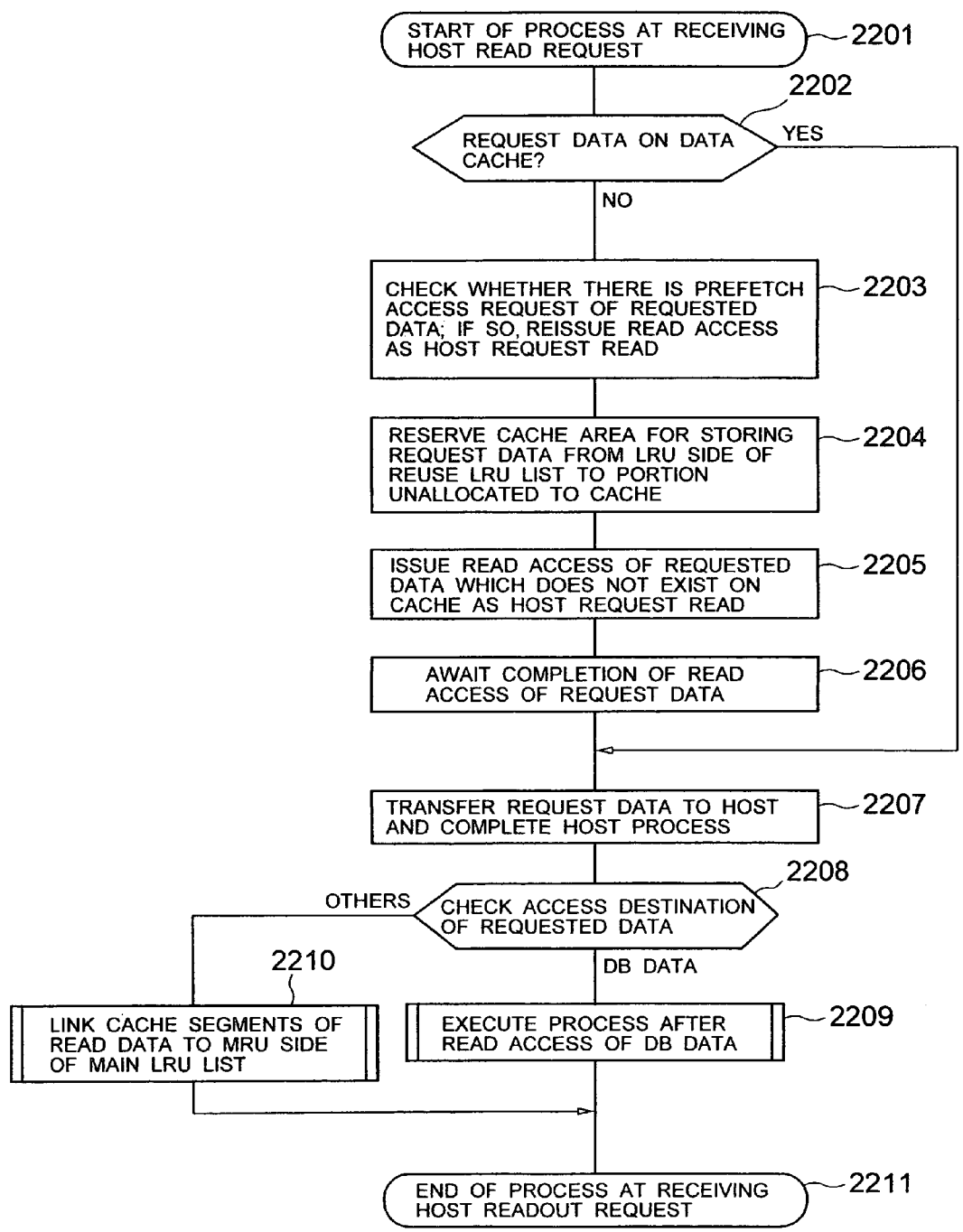
FIG. 17 is a diagram showing a processing flow used when the storage system 10 has received a read access request from the DB host 80a or 80b.

Referring to FIG. 17, there is shown a processing flow used when the storage system 10 received the read access request from the DB host 80a or 80b via the I/O path 71. When a read request arrived at the I/O path interface 70 via the I/O path 71, the I/O path interface control section 58 transmits the request to the cache control section 54 and the cache control section 54 starts the process. In step 2201, the process is started. At this time, the access destination from the DB host 80a or 80b is indicated by the volume 501 and the volume logical block number 512.

In step 2202, it is checked whether specified data exists on the data cache 28. This check is performed by referring to the cache segment information 720 using the read destination volume name 501 and the volume logical block number 512 and checking that the corresponding entry exists and the status information 722 is not invalid. If all request data exists on the data cache 28, the control proceeds to step 2207; if not, it proceeds to step 2203.

In the step 2203, it is checked whether the prefetch process of reading data of the access destination has already been issued. If it exists, it is changed to one requested by the host. First, the volume physical storage location management information 42 is referred by using the volume name 501 and the volume logical block number 512 of the access destination to obtain the physical storage device name 502 and the physical block number 514 corresponding to the access destination area.

Based on them, with reference to the disk I/O execution management information 860 and the read queue array 863 in the I/O execution management information 861 corresponding to the physical storage device name 502 in it, it is checked whether there is any access request corresponding to the previously obtained read request among access requests existing in the queues having a specifier 867 set to "prefetch."

If there is, it is linked anew to a queue having a specifier 867 set to "host request read" in the same process priority 831.

In step 2204, cache segments are allocated to data that has not been allocated yet to read destination cache segments. Cache segments of the amount required to store unallocated data is reserved from the LRU side of the reuse LRU list 743. Entries are updated correspondingly in the cache segment information 720 and the reuse LRU list information 743. The volume name 501 and the volume logical block number 512 of the corresponding entries in the cache segment information 720 are updated so as to indicate the read destination and then the value of the status information 722 is set to "invalid."

In step 2205, a read request is issued to the data to which the cache segments are allocated in the step 2204. At this time, the volume physical storage location management information 42 is referred to by using the volume name 501 and the volume logical block number 512 of the access destination for each cache segment to obtain the physical storage device name 502 and the physical block number 514 corresponding to it.

Furthermore, the data structure physical storage location information 712 is referrd by using the volume name 501 and the volume logical block number 512 of the access destination to obtain the DBMS name 631 and the data structure name 561 indicating a data structure of the DBMS 110a or 110b corresponding to the area. If the DBMS name 631 and the data structure name 561 are obtained, the DBMS data structure process priority information 840 is referenced by using the set of data to obtain the effective process priority 842 and it is treated as a process priority of this access. If not, the general data process priority 845 is referenced and the value is treated as a process priority of this access.

Based on the obtained information, a read access request is generated. This request include the physical storage device name 502, the physical block number 514, and the segment ID 721 of a cache to which data is read out. With the access process priority obtained to read data treated as the process priority 841, "host request read" is specified for the specifier 867 and then it is added to the corresponding queue in the read queue array 863 in the I/O execution management information 861 corresponding to the physical storage device name 502 of the access destination. An access executing control to the physical storage device 18 will be described later regarding the access request added to the queue.

In step 2206, the system enters the wait state until all of the issued read access requests are completed to have all data for which read requests are issued from the DB host 80a or 80b. When all data is completed, the control proceeds to step 2207.

In step 2207, a set of the segment IDs 721 are returned to the I/O path interface control section 58 as information indicating a portion on the cache of the data for which the read request is made from the DB host 80a or 80b. The I/O path interface control section 58 transfers the data to the DB host 80a or 80b via the I/O path 71 by using the I/O path interface 70 and completes the process with the DB host 80a or 80b.

In step 2208, a type of data of the access destination is checked. The data structure physical storage location information 712 is referred by using the volume name 501 and the volume logical block number 512 of the access destination to obtain the DBMS name 631 and the data structure name 561 indicating the data structure of the DBMS 110a or 110b corresponding to the area. If it is obtained, the data is considered to be DB data and the control proceeds to step 2209; if not, the control proceeds to step 2210.

In step 2209, the system executes a process subsequent to the read access of the DB data. Details of the process will be described later. After a completion of the process, the control proceeds to step 2211 directly to complete the process at receiving the read access request from the DB host 80*a* or 80*b*.

In step 2210, the access destination cache segments are linked to the MRU side of the main LRU list and then the corresponding entries of the cache segment information 720, the main LRU list information 741, and, if necessary, the reuse LRU list information 743 are updated correspondingly. Then, the control proceeds to the step 2211 to complete the process at receiving the read access request from the DB host 80*a* or 80*b*.

Figure 18:
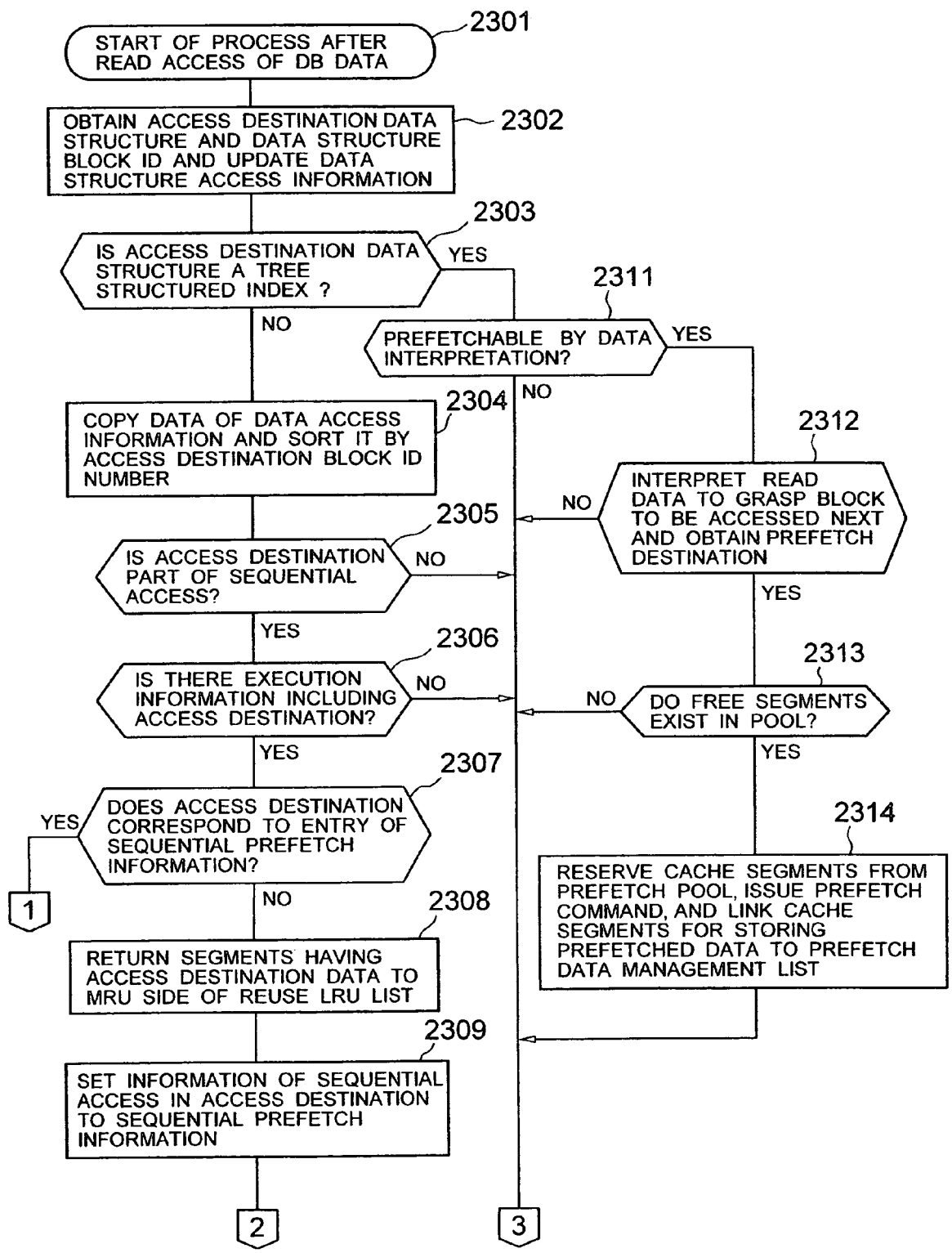
FIG. 18 is a diagram (1) showing a processing flow after the DB data read access.
Figure 19:
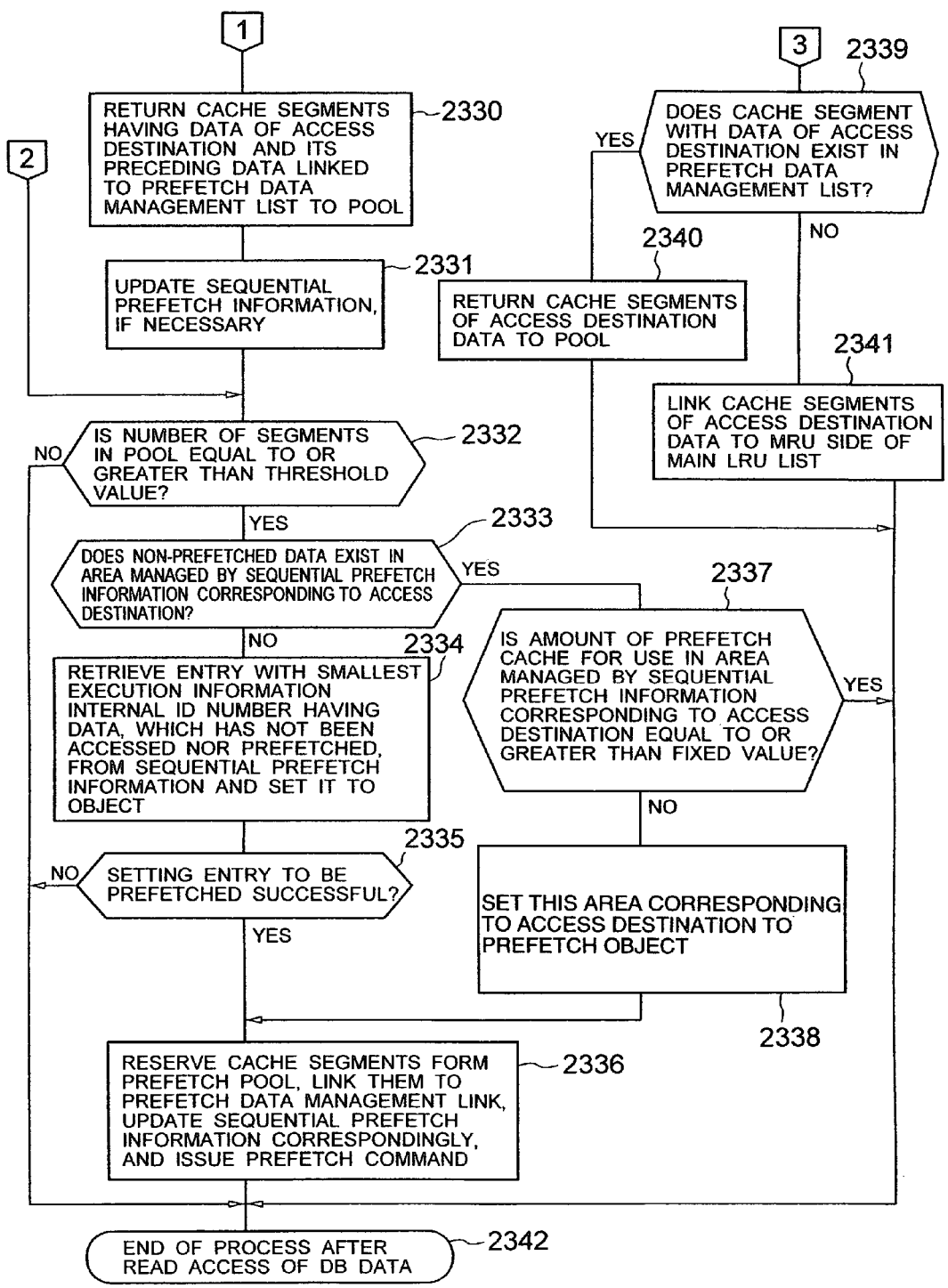
FIG. 19 is a diagram (2) showing a processing flow after the DB data read access.

Referring to FIG. 18 and FIG. 19, there is shown a processing flow of a process subsequent to the DB data read access. When starting this process, the system is given the volume name 501 and the volume logical block number 512 of the access destination and the segment ID 721 where the data exists. In step 2301, the process is started.

In step 2302, the data structure physical storage location information 712 is referred, first, by using the volume name 501 and the volume logical block number 512 to obtain the DBMS name 631, the data structure name 561, and the data structure block ID number 716 of the area indicating the data structure of the DBMS 110*a* or 110*b* corresponding to the area. The data structure access information 825 is referred to by using the obtained DBMS name 631 and the data structure name 561 to add an access destination identified from the obtained data structure block ID number 716 to the data access information 826.

In step 2303, the DBMS index definition information 624 is referred to by using the DBMS name 631 and the data structure name 561 as index names 635 to check whether the access destination is of a tree-structured index type. If no entry is detected as a result of the reference or the index type 636 is not a tree-structured index, the control proceeds to step 2304; if the index type 636 is a tree-structured index, the control proceeds to step 2311.

In the step 2304, the system copies data corresponding to the DBMS name 631 and the data structure name 561 in on the data access information 826 and sorts the data by using the data structure block ID number 716 of the access destination.

In step 2305, it is checked whether the access destination is a part of a sequential access. A result of the sorting in the step 2304 is used for the determination. It is checked whether the area previous to the access destination is almost sequentially accessed by using the result of the sorting. If so, it is determined to be a part of the sequential access; if not, it is determined not to be a part of the sequential access.

If a bitmap index is used in the DBMS 110*a* or 110*b*, the accesses may be close to a sequential access, though an access not completely sequential may be executed. Therefore, in determining the sequential characteristic, a permissible access pattern is not always true sequential. In other words, even if access destination areas exist at intervals equal to or smaller than a fixed value, the access is determined to be a sequential access. If it is determined to be a part of a sequential access, the control proceeds to step 2306; if not, it proceeds to step 2339.

In step 2306, it is checked whether there is execution information corresponding to the access destination. From the previously obtained DBMS name 631, the system obtains the execution information ID 801 managing the execution information corresponding to it and refers the DBMS process plan information 805 from this and previously obtained data structure name 561 to obtain the corresponding entry. The access type 808 in the corresponding entry is checked to obtain sets of the execution information ID 801 and the execution information internal ID number 806 of the entry having the "sequential" access type. At this time, if no corresponding entry is found, the control proceeds to the step 2339; otherwise, it proceeds to step 2307.

In the step 2307, it is checked whether there is the corresponding entry in the sequential prefetch information 810. The sequential prefetch information 810 is referenced by using a set of the execution information ID 801 and the execution information internal ID number 806 obtained in the step 2306 so as to obtain an entry having the data area range 812 corresponding to the data structure block ID number 716 of the previously obtained access destination to obtain the DBMS cache management ID 811 in the entry, to refer to the DBMS data cache management information 830 by using it to obtain a list of segments managed by this, and to obtain the volume name 501 and the block number 512 of data stored in the cache segments existing in the list.

It is checked whether the prefetched data area includes the access destination. At this time, even if the access destination does not completely match the obtained prefetched area, it is determined to be included if a distance between them is equal to or smaller than a fixed number of blocks. This distance is determined by means of a difference in the data structure block ID number 716 and the corresponding value of the prefetched area is obtained by referring to the data structure physical storage location information 712 by using the volume name 501 and the block number 512. If the access destination is determined to be included in the area, the entry of the sequential prefetch information 810 is determined to be an entry corresponding to the access destination and then the control proceeds to step 2330; if it is not found, the control proceeds to step 2308.

In step 2308, the cache segments having the access destination data is linked to the MRU side of the reuse LRU list and then entries are updated correspondingly in the cache segment information 720 and the reuse LRU list information 743 and, if necessary, the main LRU information 741.

In step 2309, sequential access information for the access destination is set to the sequential prefetch information. The sequential prefetch information 810 is set anew on the basis of the previously obtained set of the execution information ID 801 and the execution information internal ID number 806 corresponding to the access destination. If there are a plurality of sets of the execution information ID 801 and the execution information internal ID number 806 corresponding to the access destination, any one is selected out of them appropriately.

If the access destination is included in the data area range 812 of another entry having the same execution information ID 801 and the execution information internal ID number 806 that have already been set in another sequential prefetch information 810, the data area range 812 of the existing entry is assumed to be only a portion preceding the access destination currently under checking and the latter portion is allocated to the data area range 812 of an entry of the sequential prefetch information 810 set anew this time. If not, the data area range 812 is set to the current access destination plus the predetermined number of blocks for a dynamic prefetch area expansion. At this time, if there is a portion overlapping with the existing entry having other identical execution information ID 801 and execution information internal ID number 806, the overlapped portion is discarded in the data area range 812 currently under setting.

The prefetch pointer 813 is set to the next block number of the current access destination and the access condition 814 is set to "executed." Furthermore, a free entry is found in the DBMS data cache management information 830 and its DBMS cache management ID 811 is set. Then, the area segment count 833 of the entry having the selected DBMS cache management ID in the DBMS data cache management information 830 is set to "0" and the control proceeds to step 2332.

In the step 2330, in an entry corresponding to the access destination of the sequential prefetch information 810, the system returns cache segments with prefetched data of an area to be accessed previous to the access destination currently under checking at the sequential access and those of the access destination under confirmation to the prefetch cache pool of the execution information. Since the DBMS cache management ID 811 corresponding to the entry and the list of segments managed by it have already been obtained in the step 2307, cache segments to be returned to the pool are obtained from them.

The execution information ID management information 800 is referred to by using the execution information ID 801 in the entry corresponding to the sequential prefetch information 810 to obtain the DBMS cache management ID 811 for managing the prefetch cache pool of the corresponding execution information and then the previously obtained cache segments to be returned to the pool are added to the pool. After that, the corresponding entries are updated in the DBMS data cache management information 830 and the cache segment information 720 correspondingly.

In step 2331, the corresponding entries are updated in the sequential prefetch information 810. If the access destination exceeds the prefetch pointer 813, the value is updated to a value of the access destination plus 1. A data area range 812 is expanded if the access destination advances to a point a fixed distance apart from the end of the data area range 812 in the entry of the sequential prefetch information 810 and there is no entry having the same execution information ID 801 and execution internal ID number 806 and data area range 812 contignons to are currently checking in the sequential prefetch information 810. In this condition, a portion not overlapping other entries is added to the end of the data area range 812 with the predetermined number of blocks for the dynamic prefetch area expansion as the maximum value and then the control proceeds to step 2332.

In the step 2332, the amount of remainder is checked in the prefetch cache pool of the execution information currently under checking. The execution information ID management information 800 is referenced by using the execution information ID 801 in the corresponding entry of the sequential prefetch information 810 to obtain the DBMS cache management ID 811 for managing the prefetch cache pool of the corresponding execution information and the DBMS data cache management information 830 is referenced to obtain the corresponding area segment count 833. If the value is equal to or greater than the predetermined threshold, the control proceeds to step 2333; if not, it proceeds to step 2342 to complete the process.

In the step 2333, it is checked whether there is data to be prefetched in an area managed by the sequential prefetch information 810 corresponding to the current access destination. This can be done by checking whether the prefetch pointer 813 of the entry exists in the data area range 812. If it exists, it is determined that there is data to be prefetched and the control proceeds to step 2337; if not, it is determined that there is no data to be prefetched and the control proceeds to step 2334.

In the step 2334, entry retrieval and determination is performed in the sequential prefetch information 810 for the next prefetch. Based on the execution information ID 801 in the entries of the sequential prefetch information 810 corresponding to the currently checked entry, entries of the sequential prefetch information 810 are retrieved to obtain its DBMS cache management information ID 811 and the DBMS data cache management information 830 is referenced by using it to select entries having "0" as the number of prefetched segments and "not executed" as the access condition 814.

An entry for the next prefetch is selected with a selecting condition of having the smallest execution information internal ID number 806 in the entries of the selected sequential prefetch information 810. In this case, a plurality of entries may have the same execution information internal ID number 806; if so, an entry having the smallest value of the data area range 812 in those is selected.

In step 2335, it is determined whether the selection of the entry in the sequential prefetch information 810 for the next prefetch is successful in the step 2334. If it is successful, the control proceeds to step 2336; if there is no entry to be prefetched, the control proceeds to step 2342 to complete the process.

In the step 2336, an area for prefetch is allocated and a prefetch command is issued. First, the execution information ID management information 800 is referenced by using the execution information ID 801 in the corresponding entry in the sequential prefetch information 810 to obtain the DBMS cache management ID 811 of the corresponding execution information, the DBMS data cache management information 830 is referred to acquire a list for management of the prefetch cache pool, and then cache segments to be assigned for the prefetch are reserved from it. The prefetch execution amount is assumed to be a predetermined amount.

These reserved cache segments are linked to the prefetch data management list managed by the DBMS data cache management information 830 indicated by the corresponding DBMS data cache management ID 811 of the sequential prefetch information 810 and then values are updated on the prefetch pool of the DBMS data cache management information 830, portions corresponding to the prefetch data management list, and the corresponding portions in the cache segment information 720.

A prefetch destination is assigned to the reserved cache segments, the volume name 501 and the volume logical block number 512 of the corresponding entry in the cache segment information 720 are updated so as to indicate the assigned destination area, and a value of the status information 722 is set to "invalid." The access destination is an area of a cache amount sequentially allocated from the prefetch pointer 813 of the corresponding entry in the sequential prefetch information 810 which is an object of the prefetch. The prefetch pointer 813 corresponds to the data structure block ID number 716. Then, the prefetch pointer 813 is advanced by the allocated amount.

The execution information ID management information 800 is referenced from the execution information ID 801 of the corresponding entry in the sequential prefetch information 810 to obtain the corresponding DBMS name 631, the DBMS process plan information 805 is referenced by using the execution information ID 801 and the execution information internal ID number 806 of the entry to obtain the data structure name 561, and the data structure physical storage location information 712 is referred to by using these values to obtain the physical storage device name 502 and the physical block number 514 of an area on the physical storage device 18 to be accessed of the access destination. In addition, the DBMS data structure process priority information 840 is referred by using the DBMS name 631 and the data structure name 561 to obtain the effective process priority 842 and it is determined to be a process priority of this access.

A prefetch access request is generated by using the allocated cache segments. It includes the physical storage device name 502, the physical block number 514, and the segment ID 721 of the cache to which data is read. The specifier 867 is set to "prefetch" with the process priority of the obtained access as the process priority 841 and it is added to the corresponding queue in the read queue array 863 in the I/O execution management information 861 corresponding to the physical storage device name 502 of the access destination. The access executing control will be described later regarding an access to the physical storage device 18 of the access request added to the queue. After that, the control proceeds to step 2342 to complete the process.

In step 2337, an amount of already prefetched data is checked in the entry of the sequential prefetch information 810 corresponding to the access destination. For this value, the DBMS data cache management information 830 is referenced by using the corresponding DBMS data cache management ID 811 of the sequential prefetch information 810 and a value of the corresponding area segment count 833 is obtained. This value corresponds to the amount of the already prefetched data. If this value is smaller than a threshold, the control proceeds to step 2338; if it is equal to or greater than the threshold, the control proceeds to step 2342 to complete the process.

In the step 2338, an area managed by an entry of the sequential prefetch information 810 corresponding to the access destination is specified as an execution object of the prefetch and the control proceeds to step 2336.

In the step 2311, it is checked whether the prefetch is executable by interpreting a content of the current access destination data. The execution information ID 801 for managing execution information corresponding to the previously obtained DBMS name 631 is obtained from the DBMS name 631 and the DBMS process plan information 805 is referenced by using it and the previously obtained data structure 561 to obtain the corresponding entry. If the corresponding entry is not obtained at this point, it is determined that the prefetch is not executable and the control proceeds to the step 2339. If the entry is obtained, the B-Tree index prefetch information 820 is referred by using the execution information ID 801 and the execution information internal ID number 806 of the entry and the corresponding entry is obtained. If the corresponding entry is not obtained at this point, it is determined that the prefetch is not executable and the control proceeds to the step 2339. If the entry is obtained, the control proceeds to the step 2312. It should be noted, however, that a plurality of entries may be obtained.

In the step 2312, a process is performed for obtaining a prefetch destination from read data. The system obtains the selection condition 821 in all entries of the B-Tree index prefetch information 820 obtained in the step 2311 and obtains the volume name 501 and the volume logical block number 512 of data accessed by the selection condition 821 after interpreting data of the access destination. It is possible that a plurality of the access destinations exist.

By referring the cache segment information 720 from the volume name 501 and the volume logical block number 512 of the next access destination, it is checked whether the next data exists on the data cache 28. If the next data exists, the interpretation process is continued recursively. If a plurality of access destinations exist, it is checked whether the next access destination data exists on the data cache 28 and data interpretation is executed for each access destination. If all data exists on the data cache 28 in the data interpretable range, it is determined that there is no prefetch destination and then the control proceeds to the step 2339; if not, the control proceeds to step 2313.

In the step 2313, an amount of remainder of the prefetch cache pool is checked in the currently checked execution information. The execution information ID management information 800 is referred by using the execution information ID 801 obtained in the step 2311 to obtain the DBMS cache management ID 811 for managing the prefetch cache pool of the corresponding execution information, the DBMS data cache management information 830 is referenced to acquire a list for managing the prefetch cache pool, and then the area segment count 833 is obtained as management information in the list. If the value is greater than "0," the control proceeds to step 2315; if the value is "0," the control proceeds to the step 2339.

In step 2314, a prefetch area is allocated to the prefetch destination obtained in the step 2312 and a prefetch command is issued. First, cache segments are reserved for a prefetch allocation from the list for managing the prefetch cache pool obtained in the step 2313. The amount of the reservation is equal to an amount corresponding to the access destination obtained in the step 2312. If the area is insufficient, all available cache segments are reserved.

The reserved cache segments are linked to the prefetch data management list managed by an entry of the DBMS data cache management information 830 indicated by the corresponding DBMS data cache management ID 811 of the B-Tree index prefetch information 820 and values are updated on the prefetch pool and portions corresponding to the prefetch data management list, of the DBMS data cache management information 830, and the corresponding portions in the cache segment information 720. A prefetch destination is assigned to the reserved cache segments, the volume name 501 and the volume logical block number 512 of the corresponding entry in the cache segment information 720 are updated so as to indicate an area for a destination of the allocation, and a value o(f the status information 722 is set to "invalid."

At this point, unless the requested amount of cache segments can be fully reserved, the prefetch cache is allocated, giving preference to areas closer to the data whose interpretation is started with regarding the number of data interpretation stages as a distance. As for an access destination, the volume name 501 and the volume logical block number 512 have already been obtained and therefore the data structure physical storage location information 712 is referenced to obtain the physical storage device name 502, the physical block number 514 as an area on the physical storage device 18 of the access destination, and the DBMS name 631 and the data structure name 561 to which this data belongs.

The DBMS data structure process priority information 840 is referenced by using the obtained DBMS name 631 and data structure name 561 to obtain the effective process priority 842 and it is determined to be a process priority of this access. A prefetch access request is generated by using the allocated cache segments. It includes the physical storage device name 502, the physical block number 514, and the segment ID 721 of the cache to which data is read.

The specifier 867 is set to "prefetch" with the obtained access process priority as the process priority 641 and it is added to the corresponding queue in the read queue array 863 in the I/O execution management information 861 corresponding to the physical storage device name 502 of the access destination. The access executing control will be described later regarding an access to the physical storage device 18 of the access request added to the queue. Subsequently, the control proceeds to the step 2339.

In the step 2339, it is checked whether there are cache segments having data of the access destination currently under checking in the prefetch data management list. The cache segment information 720 is referenced by using the segment ID 721 of the cache having the data and then the corresponding list information 723 is referenced to determine which management list is used for the management. If they exist in the prefetch data management list, the control proceeds to step 2340; if not, the control proceeds to step 2341.

In the step 2340, the cache segments having the access destination data currently under checking are returned to the prefetch cache pool in the execution information including the prefetch data management list for managing the cache segments. Since the corresponding prefetch data management list is obtained in the step 2339, the DBMS cache management ID 811 corresponding to it is obtained. Based on this value, an entry is obtained in the sequential prefetch information 810 or the B-Tree prefetch information 820 having the prefetch data management list. If it belongs to neither of them, they already exist in the prefetch cache pool and therefore the following list change process is not performed.

By using the execution information ID 801 in the obtained entry of the sequential prefetch information 810 or the B-Tree prefetch information 820, the execution information ID management information 800 is referenced to obtain the DBMS cache management ID 811 for managing the prefetch cache pool list to which the cache segments are returned. The cache segments having the access destination data currently under checking are removed from the prefetch data management list currently managing them, they are linked to the prefetch cache pool list, and values are updated correspondingly on portions corresponding to the prefetch pool and the prefetch data management list in the DBMS data cache management information 830 and the corresponding portions in the cache segment information 720. After completing these processes, the control proceeds to step 2342 to complete the process.

In the step 2341, the cache segments having the access destination data currently under checking are removed from the current management list once and then they are linked to the MRU side of the main LRU list before updating the corresponding entry of the cache segment information 720, the main LRU list information 741, and if necessary, the reuse LRU list information 743 correspondingly. After completing these processes, the control proceeds to step 2342 to complete the process.

Figure 20:
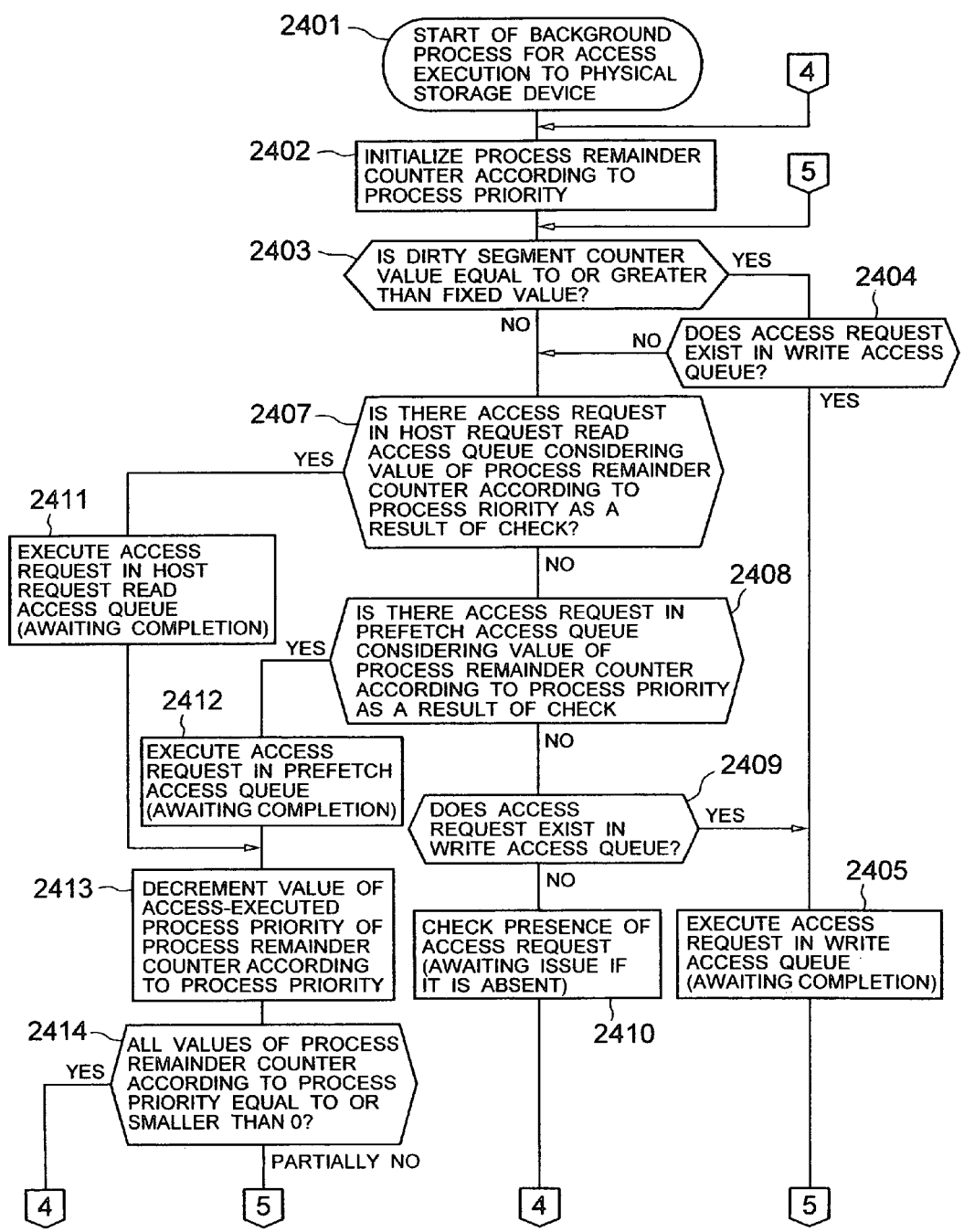
FIG. 20 is a diagram showing a processing flow of a background process for accessing a physical storage device 18 using disk I/O execution management information 860.

Referring to FIG. 20, there is shown a processing flow of a background process for performing an access process to the physical storage device 18 using the disk I/O execution management information 860. This process is executed for each physical storage device 18; it is started in the disk controller control section 52 at the same time when the storage system 10 starts to operate and the process is in an endless loop. In step 2401, the process is started. At this point, the physical storage device name 502 is specified as an identifier of an object physical storage device 18.

In step 2402, initialization is performed on the process remainder count value 868 in the process remainder counter according to a process priority 866 in the I/O execution management information 861 for the object physical storage device name 502 in the disk I/O execution management information 860. At this point, the process priority information 850 is referred to obtain the allocation I/O ratio 851 for each process priority 841 and then a value equal to the obtained ratio multiplied by a predetermined value is assigned to the corresponding portion of the process remainder count value 868 in the process remainder counter according to a process priority 866. After the initialization, the control proceeds to step 2403.

In the step 2403, a check is made on a value of the dirty segment counter 746 in the cache segment utilization management information 740. If the value is equal to or greater than a predetermined threshold, the control proceeds to step 2404; if not, it proceeds to step 2407.

In the step 2404, it is checked whether there is a write request in the write queue 864 in the I/O execution management information 861 corresponding to the object physical storage device name 502. If there is, the control proceeds to step 2405; if not, it proceeds to step 2407.

In the step 2405, a write request existing at the beginning of the write queue 864 is picked up from the queue in the I/O execution management information 861 corresponding to the object physical storage device name 502 to execute the write process to the physical storage device 18 having the object physical storage device name 502. The completion of the write process is awaited and, after completion of the process, the cache segment information 720 is updated. Since the object segment ID 721 is included in the access request, the status information 722 of the corresponding entry in the cache segment information 720 is set to "normal." After that, the control proceeds to the step 2403. It should be noted, however, that a plurality of write requests can be executed simultaneously.

In step 2407, it is checked whether there is an access request in the host request read access queue in the I/O execution management information 861 corresponding to the object physical storage device name 502. At this point, the process remainder counter according to a process priority 866 is considered. First, the highest process priority 841 is obtained out of the priorities whose process remainder count value is other than "0" in the process remainder counter according to a process priority 866. The read queue array 863 is referred by using the obtained process priority 841 and "the host request read" in the specifier 867; if there is an access request in the corresponding access queue, the process priority 841 is stored and the control proceeds to step 2411. If not, the second highest process priority 841 is obtained out of the priorities whose process remainder count value is other than "0" in the process remainder counter according to a process priority 866 and an access request is checked in the same manner; if there is, the process priority is stored and the control proceeds to step 2411.

Hereinafter, the checking process is repeatedly on the process priority 841 and on whether there is an access request in the value with taking into consideration the process remainder count value in the process remainder counter according to a process priority 866. If there is, the process priority at that time is stored and the control proceeds to the step 2411; if not, the control proceeds to the step 2408.

In the step 2408, it is checked whether there is an access request in the prefetch access queue in the I/O execution management information 861 corresponding to the object physical storage device name 502. At this point, the process remainder counter according to a process priority 866 is considered. First, the highest process priority 841 is obtained out of the priorities whose process remainder count value is other than "0" in the process remainder counter according to a process priority 866.

The read queue array 863 is referenced by using the obtained process priority 841 and "the prefetch" in the specifier 867; if there is an access request in the corresponding access queue, the process priority 841 is stored and the control proceeds to step 2412. If not, the checking process is repeated on the process priority 841 and on whether there is access request in the value with taking into consideration the process remainder count value in the process remainder counter according to a process priority 866. If there is, the process priority is stored at that time and the control proceeds to the step 2412; if not, the control proceeds to the step 2409.

In the step 2409, it is checked whether there is a write request in the write queue 864 in the I/O execution management information 861 corresponding to the object physical storage device name 502. If there is, the control proceeds to the step 2405; if not, the control proceeds to step 2410.

The control proceeds to the step 2410 when there is no access request or when an existing access request is not executable due to a consideration of the process remainder counter according to a process priority 866. In this embodiment, it is checked whether there is no access request in the read queue array 863 and the access request write queue 864. If there is at least one access request, the control proceeds to the step 2402 immediately. If there is no access request, an issue of a new access request is awaited in this step. Then, when the access request is issued, the control proceeds to the step 2402.

In the step 2411, by referring the process priority 841 stored in the step 2407 and "the host request read" as a specifier 867 in the read queue array 863 in the I/O execution management information 861 corresponding to the object physical storage device name 502, a single access request is picked up from the corresponding access queue to execute a read process from the physical storage device 18 having the object physical storage device name 502.

Completion of the read process is awaited and, after the completion of the process, the cache segment information 720 is updated. The object segment ID 721 is included in the access request and therefore the status information 722 of its corresponding entry in the cache segment information 720 is set to "normal." After that, the control proceeds to step 2413.

At this point, a plurality of read requests can be executed simultaneously. It should be noted that, however, the upper limit equals a value of the process remainder count value 868 corresponding to the process priority 841 stored in the step 2407 in the process remainder counter according to a process priority 866.

In the step 2412, the process priority 841 stored in the step 2408 and "prefetch" as a specifier 867 are referenced in the read queue array 863 in the I/O execution management information 861 corresponding to the object physical storage device name 502 and a single access request is picked up from the corresponding access queue to execute a read process from the physical storage device 18 having the object physical storage device name 502.

Completion of the read process is awaited and, after the completion of the process, the cache segment information 720 is updated. The object segment ID 721 is included in the access request and therefore the status information 722 of its corresponding entry in the cache segment information 720 is set to "normal."

After that, the control proceeds to step 2413. At this point, a plurality of read requests can be executed simultaneously. It should be noted that, however, the upper limit equals a value of the process remainder count value 868 corresponding to the process priority 841 stored in the step 2408 in the process remainder counter according to a process priority 866.

In the step 2413, the process remainder count value 868 is updated in the process remainder counter according to a process priority 866 in the I/O execution management information 861 corresponding to the object physical storage device name 502. The number of read accesses executed in the step 2411 or 2412 is subtracted from the process remainder count value 868 corresponding to the process priority 841 at which the read requests have performed.

In step 2414, the process remainder count value 868 is checked in the process remainder counter according to a process priority 866 in the I/O execution management information 861 corresponding to the object physical storage device name 502. If all process remainder count values 868 are equal to or smaller than 0 in the object process remainder counter according to a process priority 866, the control proceeds to the step 2402; if not, the control proceeds to the step 2403.

Figure 21:
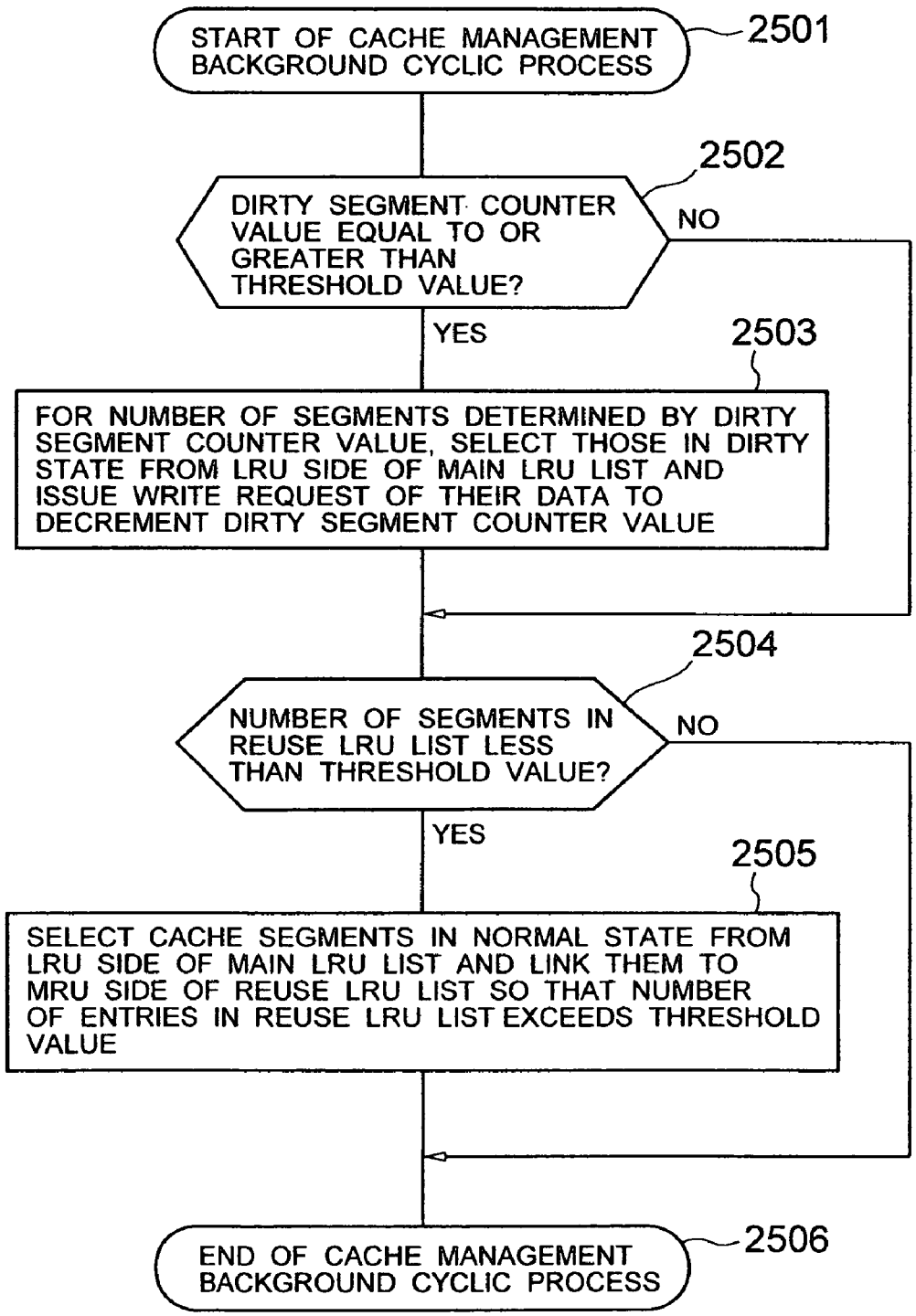
FIG. 21 is a diagram showing a processing flow of a cyclic process for managing the number of dirty segments executed on the background and the number of segments existing in a reuse LRU list.

Referring to FIG. 21, there is shown a processing flow of a cyclic process executed by the cache control section 54 on the background. This process is for use in keeping the number of dirty segments at a fixed value or smaller and the number of segments existing in the reuse LRU list at a fixed value or greater; simultaneously with the operation start of the storage system 10, the process is started at regular intervals such as, for example, 1-sec intervals. The process is started in step 2501.

In step 2502, a check is made on a value of the dirty segment counter 746 in the cache segment utilization management information 740. If the value is equal to or greater than a predetermined threshold, the control proceeds to step 2503; if not, the control proceeds to step 2504.

In the step 2503, the cache control segment performs a process of issuing an access request for writing partial data of cache segments having the status information 722 set to "dirty" in the cache segment information 720 into the physical storage device 18 so that a value of the dirty segment counter 746 is smaller than the threshold set forth in the above. At this point, the number of segments to be written is assumed to be a value of the dirty segment counter 746 minus the above threshold plus a predetermined value.

The cache segments having the status information 722 set to "dirty" in the cache segment information 720 are selected by the previously obtained number of write segments from the LRU side of the main LRU list and the status information 722 is set to "write." Then, there are obtained the segment ID 721 of the obtained cache segment, the volume name 501 and the volume logical block number 512 of data stored in the segment.

Obtaining the corresponding physical storage device name 502 and the physical block number 514 from the obtained volume name 501 and the volume logical block number 512 and further specifying the segment ID 721 of a cache having the data, a write access request is generated and it is added to the write queue 864 in the I/O execution management information 861 corresponding to the physical storage device name 502 of an access destination in the disk I/O execution management information 860. After that, the number of generated write access requests are subtracted from the value of the dirty segment counter 746 and then the control proceeds to the step 2504.

In the step 2504, a check is made on the number of segments existing in the list stored in the reuse LRU list information 743 in the cache segment utilization management information 740. If the value is smaller than a predetermined threshold, the control proceeds to step 2505; if it is equal to or greater than the threshold, the control proceeds to step 2506 to complete the process.

In the step 2505, a part of segments existing in the main LRU list are moved to the reuse LRU list to increase the number of segments existing in the reuse LRU list. At this point, it is assumed that the number of segments to be moved is equal to a value of the above threshold minus the number of segments existing in the list of the reuse LRU list information 743 plus a predetermined value.

After selecting cache segments having the status information 722 set to "normal" in the cache segment information 720 by the previously obtained number of segments to be moved from the LRU side of the main LRU list and removing them from the main LRU list, they are linked anew to the MRU side of the reuse LRU list. Then, the entry of the corresponding cache segment information 720, the main LRU list information 741, and the reuse LRU list information 743 are updated correspondingly. Subsequently, the control proceeds to step 2506 to complete the process.

Second Embodiment

In this embodiment, in a computer system connected to a computer executing a DBMS and to a storage system having a data cache in units of a file for management, the storage system acquires information on the DBMS, information on mapping of data locations outside the storage system, execution plan information for a query executed by the DBMS, and DB process priority information, by which the storage system provides more preferable access performance using them. The storage system can grasp which data in what order and how the DBMS will now access it by using the information on the DBMS, information on mapping of data locations outside the storage system, and an execution plan for a query executed by the DBMS.

Therefore, by using the information on the grasped access method, data most likely to be used is prepared on the data cache of the storage system in advance, thereby providing a higher access performance to the DBMS. In addition, by using the DB process priority information, a physical storage device of the storage system is preferentially accessed for DB data having a higher process priority or a higher utilization of the data cache is allocated to the data, thereby improving the access performance for the DB data having a higher process priority.

Figure 22:
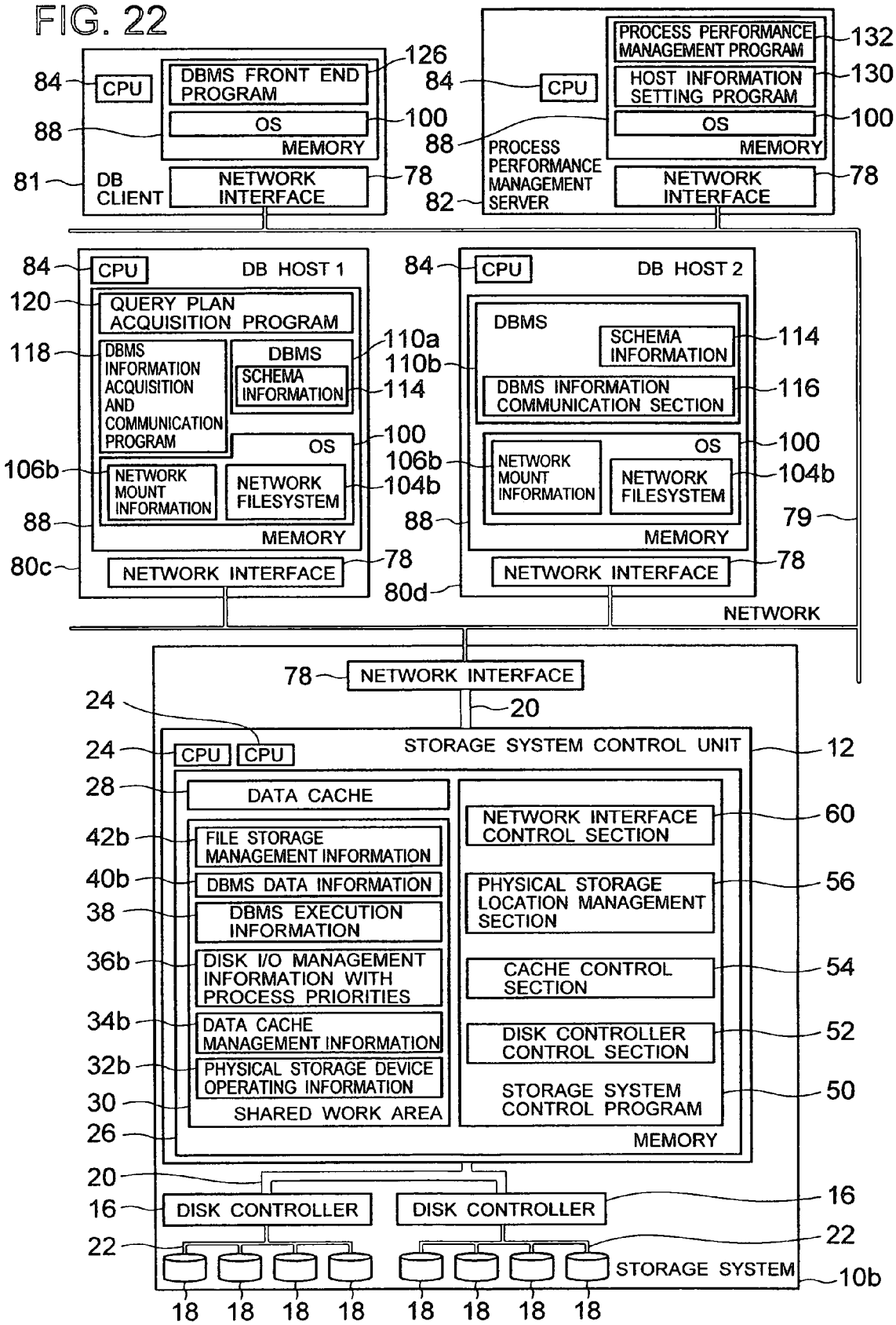
FIG. 22 is a diagram showing a configuration of a computer system according to a second embodiment.

Referring to FIG. 22, there is shown a configurational diagram of the computer system according to the second embodiment of the present invention. As shown, the second embodiment of the present invention differs from the first embodiment in the following points.

In this embodiment, the I/O path interface 70, the I/O path 71, and the I/O path switch 72 do not exist; the storage control unit 10*b* and the DB hosts 80*c* and 80*d* are connected only via the network 79. The storage system 10 is modified to a storage system 10*b* for a data storage management in units of a file. Accordingly, the physical storage device operating information 32, the data cache management information 34, the disk I/O management information with process priorities 36, the DBMS execution information 38, the DBMS data information 40, and the volume physical storage location management information 42 are modified to a physical storage device operating information 32*b*, a data cache management information 34*b*, a disk I/O management information with process priorities 36*b*, a DBMS execution information 38*b*, a DBMS data information 40*b*, and a file storage location management information 42*b*, respectively.

In the OS 100 executed in the DB hosts 80*c* and 80*d*, the volume manager 102 and the filesystem 104 are deleted and instead there is added a network filesystem 104*b* having a function for accessing a file provided by the storage system 10*b* and the mapping information 106 retained in the OS 100 is modified to network mount information 106*b*.

The storage system 10 is modified to the storage system 10*b* which manages data in units of a file. An access from the DB host 80*c* or 80*d* is also implemented in a protocol on a file basis. The role of the volume in the storage system 10 is filled by a file or a filesystem for managing files in the storage system 10*b* and storage location management information of the file is the file storage management information 42*b*. A single storage system 10*b* can contain a plurality of filesystems. As for the operating information of the physical storage device 18, the acquisition in units of a volume is modified to one in units of a filesystem or a file.

Figure 23:
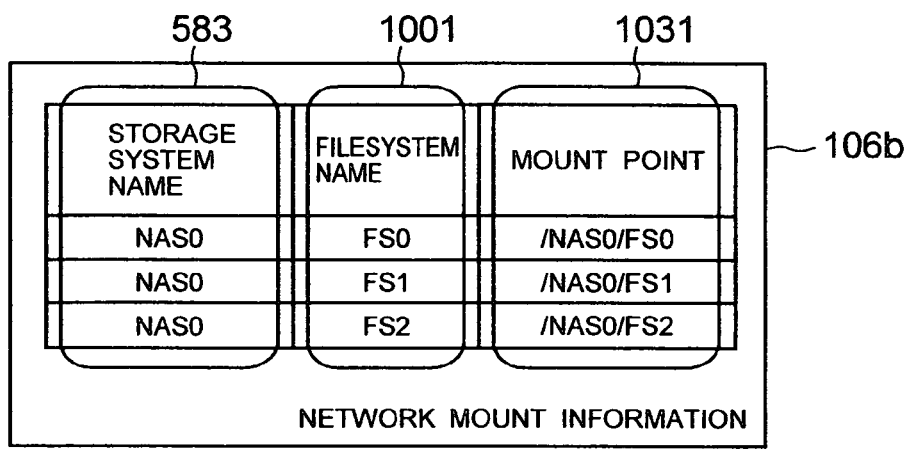
FIG. 23 is a diagram showing network mount information 106b stored in an OS 100 of DB hosts 80c and 80d.

Referring to FIG. 23, there is shown network mount information 106*b* stored in the OS 100 of the DB hosts 80*c* and 80*d*. The network mount information 106*b* is information of a filesystem mounted in the DB hosts 80*c* and 80*d* which are provided by the storage system 10*b*, having sets of a storage system name 583 which is an identifier of a storage system which has provided the filesystem and, a filesystem name 1001 as a identifer of the filesystem, and a mount point 1031 which is information of a mount point of the filesystem.

Figure 24:
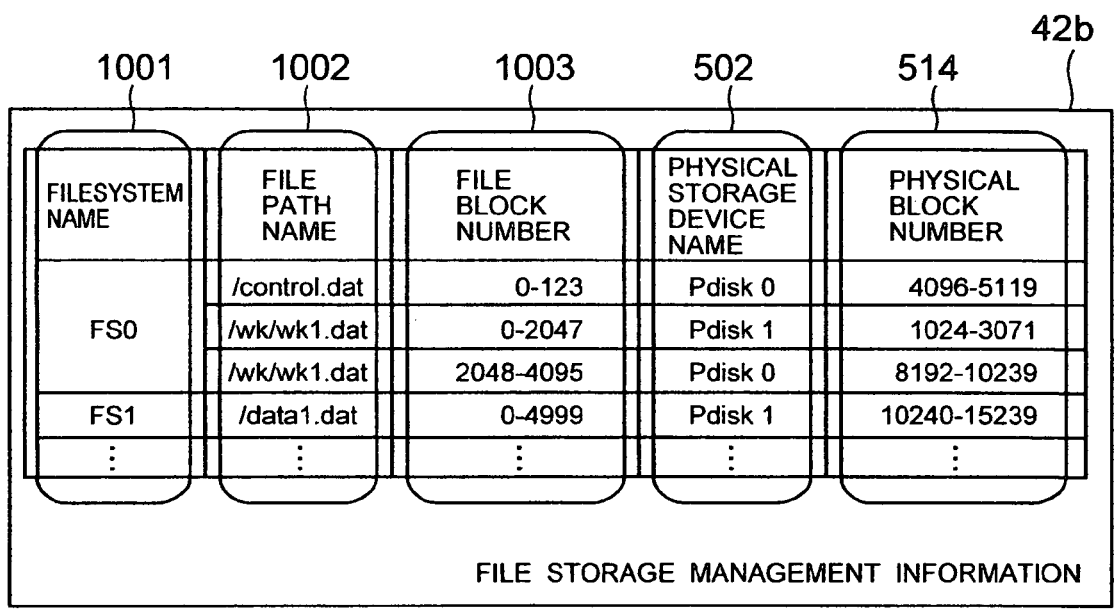
FIG. 24 is a diagram showing file storage management information 42b stored in a storage system 10b.

Referring to FIG. 24, there is shown file storage management information 42*b* stored in the storage system 10*b*. It differs from the volume physical storage location management information 42 shown in FIG. 4 in that the volume name 501 as a volume identifier is modified to a filesystem name 1001 and that a file path name 1002 to be a file identifier and the volume logical block number 512 indicating a data area in a volume is modified to a file block number 1003.

Figures 25, 26:
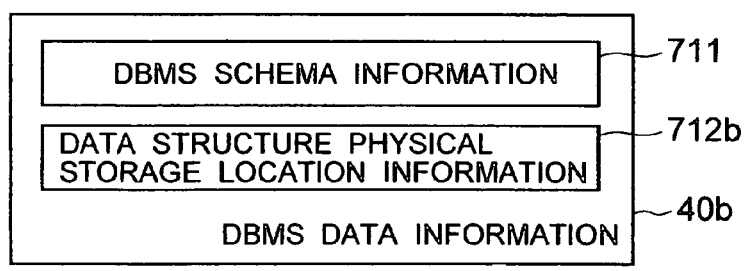
FIG. 25 is a diagram showing physical storage device operating information 32b stored in the storage system 10b.
FIG. 26 is a diagram showing DBMS data information 40b stored in the storage system 10b.

Referring to FIG. 25, there is shown a physical storage device operating information 32*b* stored in the storage system 10*b*. It differs from the physical storage device operating information 32 shown in FIG. 5 in that a portion of the volume name 501 is modified to the filesystem name 1001 due to a change of the operating information acquisition unit from the volume to the filesystem. In addition, the operating information acquisition unit can be a file; if so, the portion of the volume name 501 is modified to the filesystem name 1001 and the file path name 1002.

Referring to FIG. 26, there is shown the DBMS data information 40*b* stored in the storage system 10*b*. It differs from the DBMS data information 40 shown in FIG. 6 in that the data structure physical storage location information 712 is modified to data structure physical storage location information 712*b* due to a change of a storage management in units of a volume to one in units of a file and that data of the mapping information 648 in the DBMS host mapping information 627 in the DBMS schema information 711 is modified from the mapping information 106 in the DB host to network mount information 106*b*.

Referring to FIG. 27, there is shown the data structure physical storage location information 712*b* included in the DBMS data information 40*b*. It differs from the data structure physical storage location information 712 shown in FIG. 8 in that portions of the volume name 501 and the volume logical block number 512 are modified to a filesystem name 1001, a file path name 1002, and a file block number 1003 due to a change of the storage management in units of a volume to one in units of a file. This information is generated by referencing the DBMS data storage location information 622 in the DBMS schema information 711, the DBMS host mapping information 627, and the file storage management information 42*b* and combining the corresponding portions.

Figure 28:
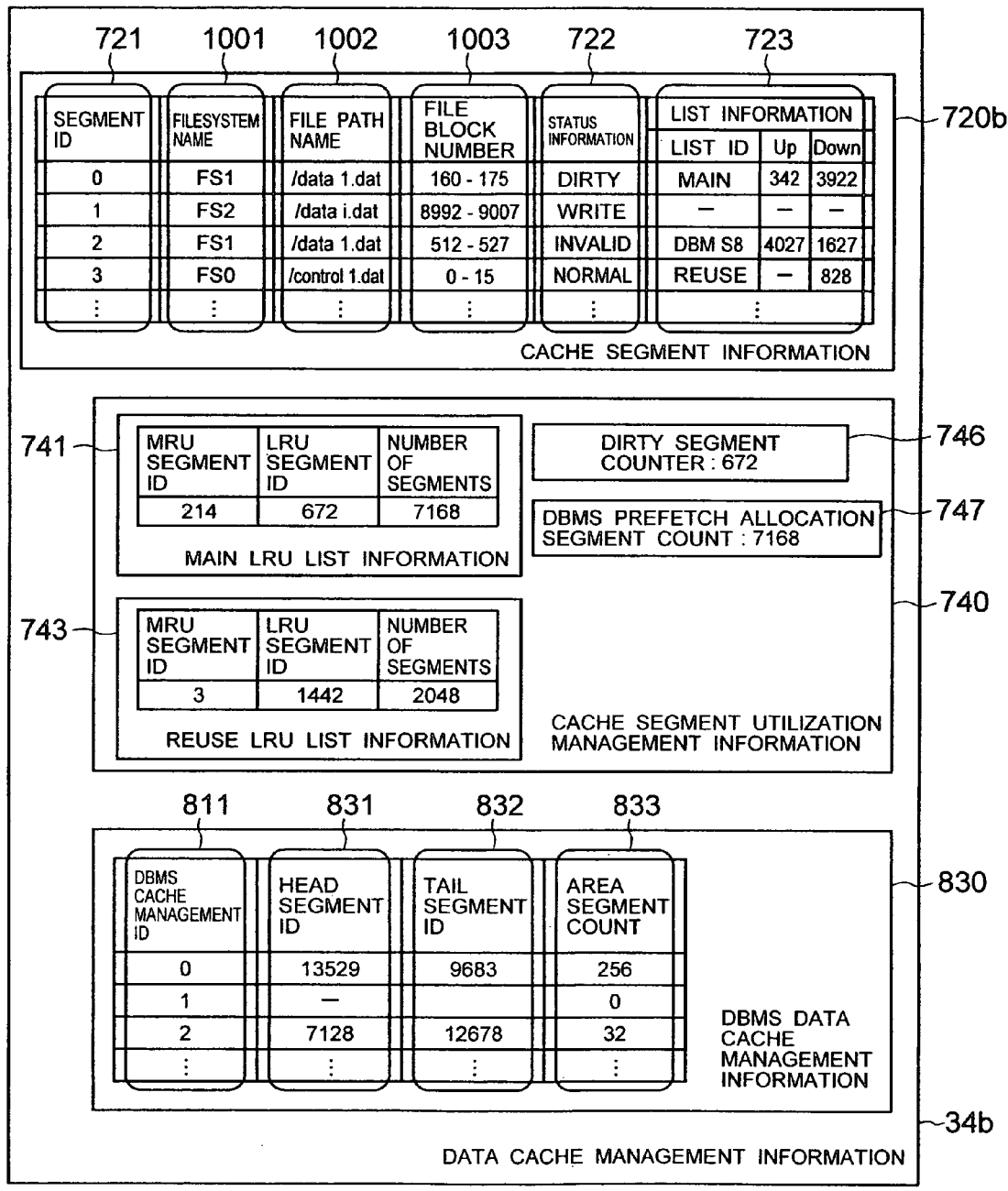
FIG. 28 is a diagram showing data cache management information 34b stored in the storage system 10b.

Referring to FIG. 28, there is shown the data cache management information 34*b* stored in the storage system 10*b*. It differs from the data cache management information 34 shown in FIG. 10 in that the cache segment information 720 is modified to cache segment information 720*b* due to a change of the storage management in units of a volume to one in units of a file. The cache segment information 720*b* differs from the cache segment information 720 in that portions of the volume name 501 and the volume logical block number 512 are modified to the filesystem name 1001, the file path name 1002, and the file block number 1003 for the above reason.

The differences in the storage system 10b of this embodiment from the first embodiment are almost all of changes from the volume name 501 to the filesystem name 1001 and the file path name 1002 and from the volume logical block number 512 to the file block number 1003. Other differences an also described. Also about the processes in the storage system 10b, the processes in the first embodiment can be applied to those in this embodiment almost directly by basically coping with the modifications in the same manner as for those set forth in the above.

The present invention enables the following. First, DBMS-oriented access optimization is realized in a storage system storing data managed by a DBMS. By using this storage system, a performance of a DBMS can be enhanced in an existing DBMS without a program modification. In other words, a high-performance DB system can be easily constructed.

Second, in the storage system storing data managed by the DBMS, the access optimization is realized with taking into consideration process priorities given to DB data or processes. By considering a process priority for each DB data or a priority for each process, it becomes possible to make a DB system keeping a process performance for a specific DB. In other words, a system conforming to the SLA (service level agreement) for DB process performances can be easily realized. In addition, a system keeping a process performance for a specific DB can be constructed, thereby reducing a management cost related to the DB system performances.

It should be further understood by those skilled in the art that the foregoing description has been made on embodiments of the invention and that various changes and modifications may be made in the invention without departing from the spirit of the invention and scope of the appended claims.

What is claimed is:

1. A storage system, comprising:
 connection means for connecting with a computer in which a database management system is operating;
 a storage device including a plurality of locations;
 information acquisition means for acquiring from said database management system through said connection means information on a data structure including a table, an index, and a log defined by a schema in a database management system of said database management system, information on recording locations in said storage device in which database data managed by said database management system is classified according to a data structure defined by said schema, and information on databases managed by said database management system including a query execution plan of a query with process priority information executed by said database management system,
 wherein said query execution plan includes information on a process order that is used to determine an execution order of processes executed by said database management system, the query execution plan further including information identifying a number of process groups each representing a set of processes to be executed at a time, the processes belonging to a first process group not being executed until after execution of all processes in a second process group, the second process group having a higher priority than the first process group;
 a cache memory storing therein said process priority information on said database;
 cache memory control means for managing said cache memory for prefetching;
 wherein said cache memory control means executes a prefetch preferentially to data of said database having a higher priority by referring to said process priority information or to said database data used by a process given a higher priority;
 wherein said cache memory control means makes a control of allocating a higher amount of cache memory to data of said database having a higher priority by referring to said process priority information or to said database data used by a process given a higher priority; and
 a storage controller for controlling to predict an index access destination in said plurality of locations of said storage device to be made for prefetching based on comparison of said process priority information and interpretation of said information acquired by said information acquisition means when interpretable.

2. The system according to claim 1, wherein said information acquisition means acquires said information on the databases managed by said database management system through at least one program other than said database management system.

3. The system according to claim 1, wherein said storage system has one or more physical storage devices for storing data in said storage device;
 wherein said storage system has physical storage control means for determining an access order of said physical storage devices; and
 wherein said physical storage control means uses the information acquired by said information acquisition means for determining the access order for said physical storage devices.

4. The system according to claim 3, wherein said storage controller comprises access prediction means for predicting an access destination and an access method of an access to be made to said physical storage devices from the information acquired by said information acquisition means.

5. The system according to claim 4, wherein said cache memory control means controls to select a cache segment for prefetching by using said access prediction means.

6. The system according to claim 5, wherein said cache memory control means executes a data prefetch execution control by using said access prediction means.

7. The system according to claim 6, wherein said information acquired by said information acquisition means includes information on a degree of parallelism used when said database management system accesses said database data belonging to an identical data structure defined by said schema.

8. The system according to claim 6, further comprising database data interpreting means for understanding a content of said database data,
 wherein said access prediction means uses said database data interpreting means.

9. The system according to claim 3, wherein said information acquired by said information acquisition means includes said process priority information on a priority of a process supplied to a database managed by said database management system or supplied to each process to be executed.

10. The system according to claim 9, wherein said physical storage control means makes a control of executing an access preferentially to data of said database having a higher priority by referring to said process priority information or to said database data used by a process given a higher priority.

11. The system according to claim 9, wherein said storage controller comprises access prediction means for predicting an access destination and an access method of an access to be made to said physical storage device from said information acquired by said information acquisition means; and wherein said cache memory control means executes a data prefetch using said access prediction means and executing a cache memory control by considering said process priority information.

12. The system according to claim 11, further comprising physical storage operating information acquisition means for acquiring operating information of said physical storage devices in said storage system, wherein said cache control means makes a control using the information acquired by said physical storage operating information acquisition means for executing a data prefetch.

13. The system according to claim 1, wherein said storage controller controls to determine whether said access destination is within a data structure of a tree-structured index and controls to predict a sequential access destination based on interpretation of said information acquired by said information acquisition means when said sequential access destination is for a sequential access.

14. The system according to claim 1, wherein said controller controls to allocate a data area in said cache memory for said access destination and prefetch data from said plurality of storage devices into said data area based on interpretation of said information acquired by said information acquisition means.

15. The system according to claim 13, wherein said controller controls to allocate a data area in said cache memory for said access destination and prefetch data from said plurality of storage devices into said data area based on interpretation of said information acquired by said information acquisition means.

16. The system according to claim 1, wherein said controller controls to determine whether an operating ratio of data having a data structure defined by said schema of said information acquired by said acquisition means is equal to or greater than a predetermined threshold value to allocate a data area in said cache memory.

17. The system according to claim 1, wherein said query execution plan is represented as a tree structure with nodes, each node representing a subdivided process that is executed to obtain a result of the query.

18. The system according to claim 17, wherein a subset of nodes is grouped together based on the process order assigned to each process.

\* \* \* \* \*